(12) United States Patent
Tanaka

(10) Patent No.: US 7,590,959 B2
(45) Date of Patent: Sep. 15, 2009

(54) LAYOUT SYSTEM, LAYOUT PROGRAM, AND LAYOUT METHOD FOR TEXT OR OTHER LAYOUT ELEMENTS ALONG A GRID

(75) Inventor: Toshio Tanaka, Shiojiri (JP)

(73) Assignee: Seiko Epson Corporation (JP)

( * ) Notice: Subject to any disclaimer, the term of this patent is extended or adjusted under 35 U.S.C. 154(b) by 284 days.

(21) Appl. No.: 11/554,118

(22) Filed: Oct. 30, 2006

(65) Prior Publication Data

US 2007/0097148 A1    May 3, 2007

(30) Foreign Application Priority Data

Oct. 31, 2005   (JP)   ............... 2005-315764
Jul. 31, 2006   (JP)   ............... 2006-208526

(51) Int. Cl.
*G06F 17/50*   (2006.01)
(52) U.S. Cl. .................. 716/8; 716/2; 716/4; 716/9; 716/10; 716/11; 716/14
(58) Field of Classification Search .............. 716/4, 716/8–11, 13
See application file for complete search history.

(56) References Cited

U.S. PATENT DOCUMENTS

| | | | | |
|---|---|---|---|---|
| 5,097,422 A | * | 3/1992 | Corbin et al. .................. 716/8 |
| 5,550,714 A | * | 8/1996 | Nishiyama ..................... 716/11 |
| 5,636,132 A | * | 6/1997 | Kamdar ......................... 716/2 |
| 5,737,237 A | * | 4/1998 | Tanaka et al. .................. 716/9 |
| 5,793,641 A | * | 8/1998 | Sayah ........................... 716/10 |
| 6,240,541 B1 | * | 5/2001 | Yasuda et al. .................. 716/6 |
| 6,505,333 B1 | * | 1/2003 | Tanaka .......................... 716/13 |
| 6,510,542 B1 | * | 1/2003 | Kojima .......................... 716/10 |
| 6,609,242 B1 | * | 8/2003 | Slade ............................ 716/14 |
| 6,629,305 B2 | * | 9/2003 | Ito et al. ........................ 716/11 |
| 7,137,092 B2 | * | 11/2006 | Maeda .......................... 716/8 |
| 7,240,318 B2 | * | 7/2007 | Ito et al. ........................ 716/11 |
| 2005/0132308 A1 | * | 6/2005 | Whitefield et al. ............. 716/4 |
| 2005/0189657 A1 | * | 9/2005 | Beaty et al. ................. 257/780 |

FOREIGN PATENT DOCUMENTS

JP          07-287771        10/1995

* cited by examiner

*Primary Examiner*—Helen Rossoshek
(74) *Attorney, Agent, or Firm*—Harness, Dickey & Pierce, P.L.C.

(57) ABSTRACT

A system is provided that sets reference points or lines in a layout region and arranges a layout element in the layout region using the positions of the reference points or lines as reference positions. The system includes: a unit storing reference position information defining positions of the reference points or lines and attribute information defining an attribute of the layout element such that the reference position information and the layout element attribute information are associated; a unit acquiring the layout element; a unit acquiring the layout element attribute information; a unit searching the reference position information corresponding to the acquired layout element attribute information; and a unit arranging the acquired layout element by using the positions of the reference points or lines as the reference positions, based on the searched reference position information.

20 Claims, 20 Drawing Sheets

| FIRST GRID INFORMATION ITEM | Height > 12-POINT | | | | | | |
|---|---|---|---|---|---|---|---|
| GRID NUMBER 1 | 25 | 20 | | | | | UPPER LEFT |
| GRID NUMBER 2 | 115 | 20 | | | | | UPPER LEFT |
| GRID NUMBER 3 | 25 | 56 | | | | | UPPER LEFT |
| GRID NUMBER 4 | 115 | 56 | | | | | UPPER LEFT |
| ⋮ | ⋮ | | | | | | |
| GRID NUMBER 12 | 115 | 200 | | | | | UPPER LEFT |

FIG. 4A

| SECOND GRID INFORMATION ITEM | Height ≤ 12-POINT | | | | | | |
|---|---|---|---|---|---|---|---|
| GRID NUMBER 1 | 20 | 20 | | | | | UPPER LEFT |
| GRID NUMBER 2 | 110 | 20 | | | | | UPPER LEFT |
| GRID NUMBER 3 | 20 | 29 | | | | | UPPER LEFT |
| GRID NUMBER 4 | 110 | 29 | | | | | UPPER LEFT |
| ⋮ | ⋮ | | | | | | |
| GRID NUMBER 48 | 110 | 227 | | | | | UPPER LEFT |

FIG. 4B

FIRST GRID
INFORMATION ITEM
SECOND GRID
INFORMATION ITEM
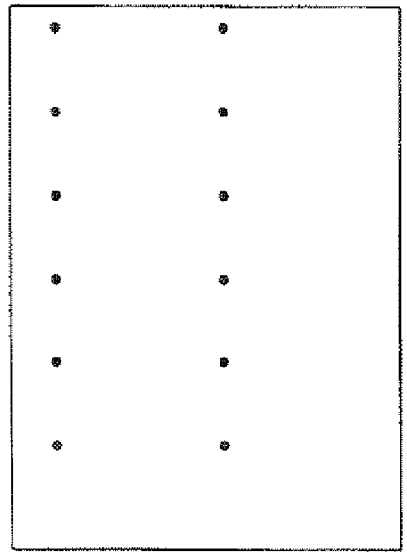
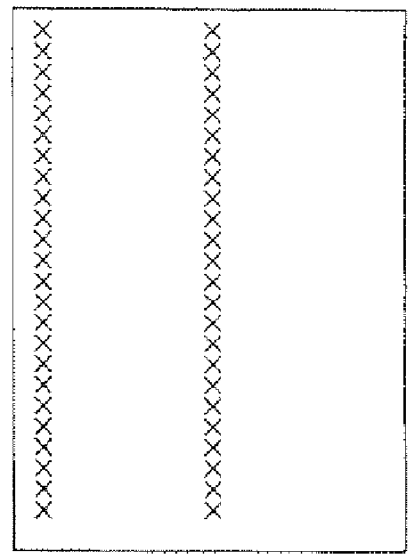
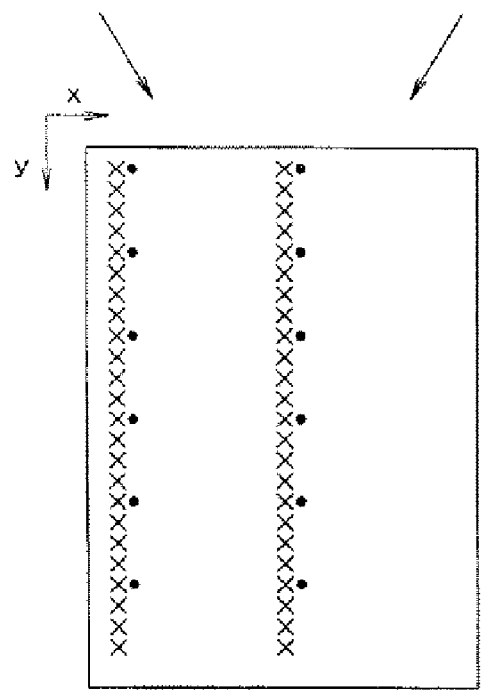
FIG. 5

| THIRD GRID INFORMATION ITEM | DataType=Text | | | | | | |
|---|---|---|---|---|---|---|---|
| GRID NUMBER 1 | 25 | 20 | 90 | 9 | | | UPPER LEFT |
| GRID NUMBER 2 | 60 | 20 | 90 | 9 | 150 | 47 | UPPER LEFT |

| FOURTH GRID INFORMATION ITEM | DataType=Table | | | | | | |
|---|---|---|---|---|---|---|---|
| GRID NUMBER 1 | 60 | 20 | 90 | 36 | | | UPPER MIDDLE |

| FIFTH GRID INFORMATION ITEM | DataType=Graph or Figure or Picture | | | | | | |
|---|---|---|---|---|---|---|---|
| GRID NUMBER 1 | 60 | 92 | 90 | 72 | | | LOWER MIDDLE |

| SIXTH GRID INFORMATION ITEM | Category=Caption | | | | | | |
|---|---|---|---|---|---|---|---|
| GRID NUMBER 1 | 60 | 96 | 90 | 72 | | | UPPER MIDDLE |

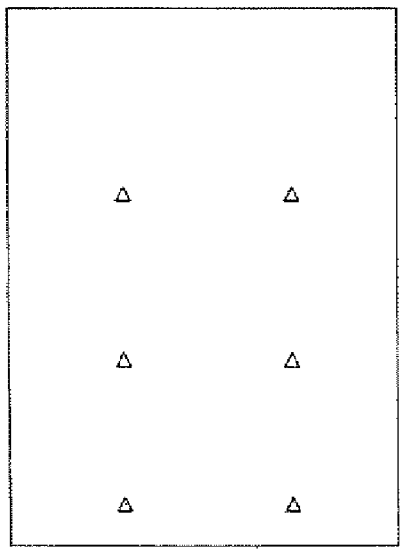
FIFTH GRID INFORMATION ITEM
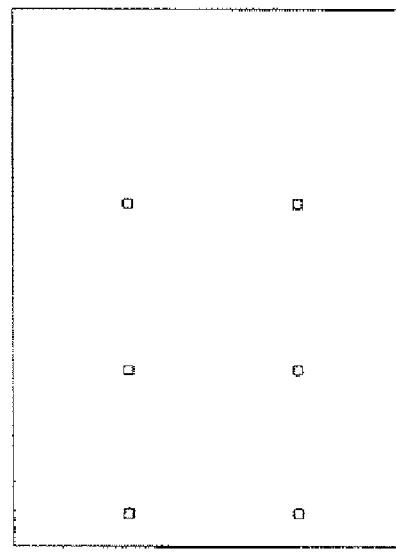
SIXTH GRID INFORMATION ITEM
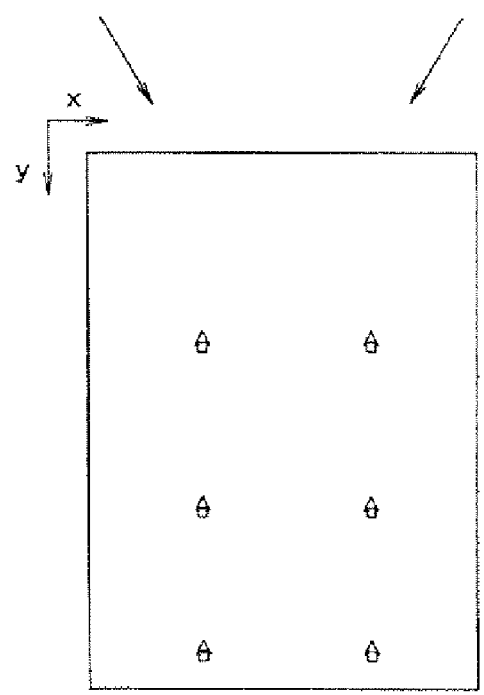
FIG.13

| SEVENTH GRID INFORMATION ITEM | Category=footnotes | | | | | | |
|---|---|---|---|---|---|---|---|
| GRID NUMBER 1 | 20 | 277 | | | | | LOWER LEFT |
| GRID NUMBER 2 | 10 | 20 | 0 | 36 | | | UPPER LEFT |
| GRID NUMBER 3 | 200 | 20 | 0 | 36 | | | UPPER RIGHT |

FIG.16A

| EIGHTH GRID INFORMATION ITEM | Category="running title" | | | | | | |
|---|---|---|---|---|---|---|---|
| GRID NUMBER 1 | 25 | 10 | | | | | UPPER LEFT |
| GRID NUMBER 2 | 185 | 10 | | | | | UPPER RIGHT |

FIG.16B

| NINTH GRID INFORMATION ITEM | Category=nombre | | | | | | |
|---|---|---|---|---|---|---|---|
| GRID NUMBER 1 | 25 | 287 | | | | | LOWER LEFT |
| GRID NUMBER 2 | 185 | 287 | | | | | LOWER RIGHT |

FIG.16C

| SEVENTH GRID INFORMATION ITEM | EIGHTH GRID INFORMATION ITEM | NINTH GRID INFORMATION ITEM |
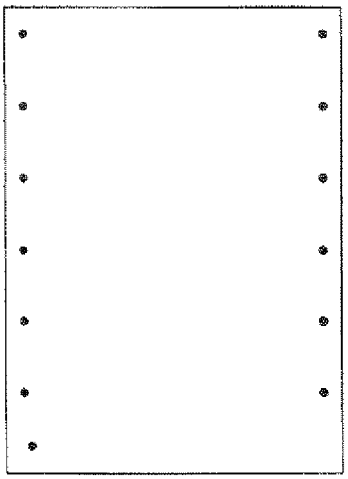 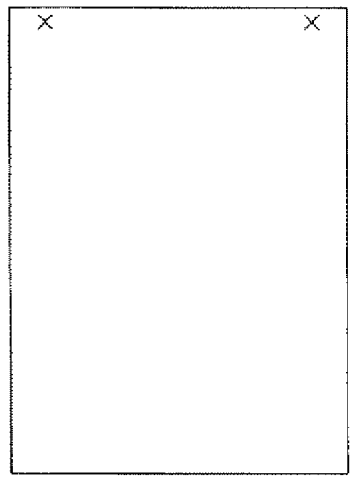 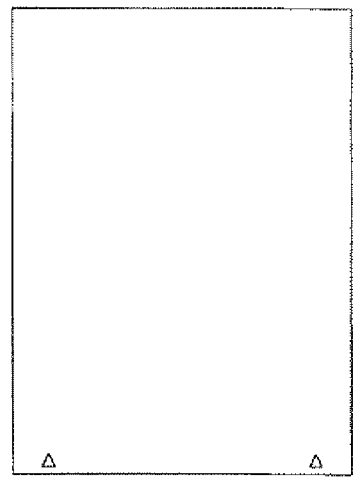
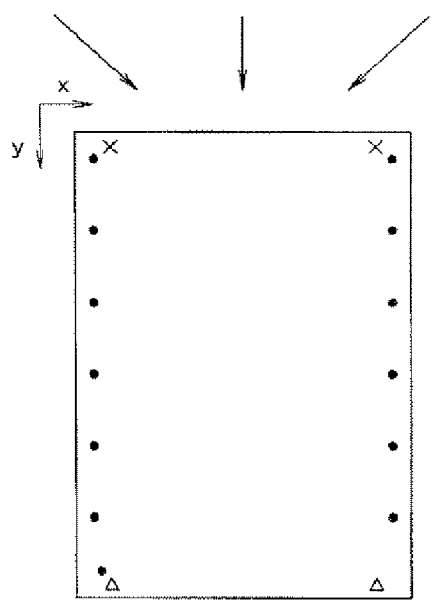
FIG.17

| TENTH GRID INFORMATION ITEM | Category=Title | | | | | | |
|---|---|---|---|---|---|---|---|
| GRID NUMBER 1 | 60 | 20 | 90 | 36 | 150 | 200 | UPPER MIDDLE |

| ELEVENTH GRID INFORMATION ITEM | Category=General | | | | | | |
|---|---|---|---|---|---|---|---|
| GRID NUMBER 1 | 60 | 20 | 90 | 9 | | | UPPER MIDDLE |

TENTH GRID
INFORMATION ITEM
ELEVENTH GRID
INFORMATION ITEM
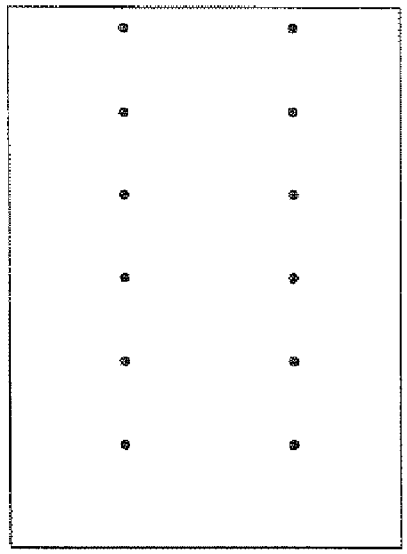
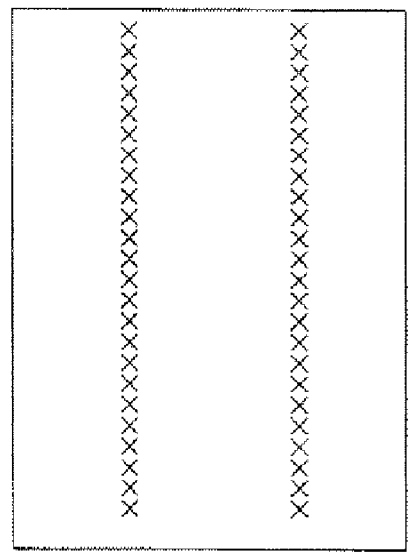
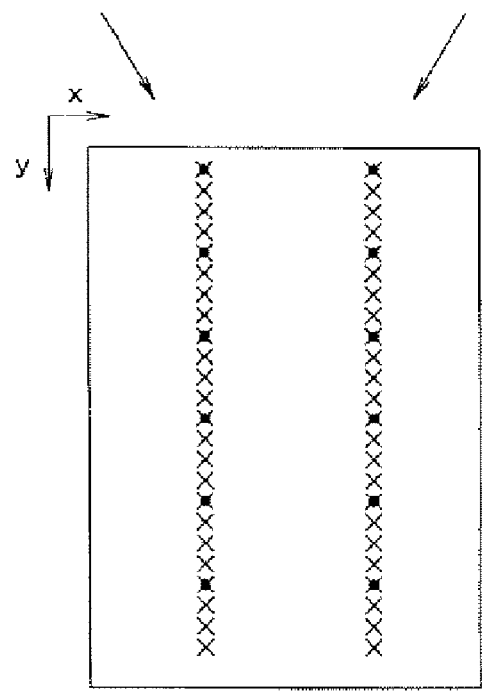
FIG.20

IN CASE OF ALPHABETICAL CHARACTERS

FIG.24A GENERAL CHARACTERS (FOR REFERENCE)

ABCDEFG

FIG.24B CHARACTERS OF SERIF TYPE

*ABCDEFG*

FIG.24C CHARACTERS OF BOLD TYPE

ABCDEFG

FIG.24D CHARACTERS HAVING LARGE WEIGHT

ABCDEFG

IN CASE OF JAPANESE CHARACTERS

FIG.24E CHARACTERS OF MING-STYLE TYPE

あいうえお

FIG.24F CHARACTERS OF GOTHIC TYPE

あいうえお

LAYOUT SYSTEM, LAYOUT PROGRAM, AND LAYOUT METHOD FOR TEXT OR OTHER LAYOUT ELEMENTS ALONG A GRID

RELATED APPLICATIONS

This application claims priority to Japanese Patent Application Nos. 2005-315764 filed Oct. 31, 2005 and 2006-208526 filed Jul. 31, 2006 which are hereby expressly incorporated by reference herein in their entirety.

BACKGROUND

1. Technical Field

The present invention relates to a system, a program, and a method for setting a grid in a layout region and arranging a layout element along the grid, and more particularly, to a layout system, a layout program, and a layout method capable of reducing labor required for a layout operation and making a layout look nice.

2. Related Art

Some layout applications have a grid function of setting a virtual grid in a layout region and arranging a layout element along the grid. The grid is used to define the position of the layout element or to set the size of the layout element to a predetermined value, and is displayed as small grid points in the layout region. When the grid is set, the position or size of the layout element is not continuously changed, and thus the layout element can be set at only the position of the grid or in only the size of the grid. Therefore, it is possible to simply align the ends of the layout elements and an interval between the layout elements by controlling the degree of freedom of the layout, and thus it is possible to make the layout look nice.

For example, JP-A-7-287771 discloses a layout system having a grid function.

In the layout system disclosed in JP-A-7-287771, a layout region is divided into a plurality of regions, and grid information associated with each of the divided regions is stored. Then, when it is required to set the grid information to a predetermined region among the plurality of divided regions, reception of grid information input is carried out, and the grid information of the predetermined region is changed to the input grid information. Then, a grid is displayed in the predetermined region on the basis of the input grid information.

However, various types of layout elements, such as an image and text, exist and different layout operations are performed according to the type of layout element. For example, in the case of text, since the position of characters or rows have an effect on a visual quality, it is necessary to adjust the arrangement of the characters or the rows in the unit of a pitch between the characters and a pitch between the rows, and thus it is preferable that the positions or sizes of the characters or the rows be minutely changed. Similarly, in the case of a table, since the position of a ruled line has an effect on visual quality, it is preferable that the position or size of the ruled line be minutely changed. In contrast, in the case of an image or a figure, in order to make the image or the figure look nice, the image or the figure needs to be exactly aligned. Therefore, in order to prevent positional deviation of the image or the figure due to a minute change in position, it is preferable that the position or size of the image or the figure be roughly changed.

The layout operation depends on the size of the layout element. For example, when the size of the layout element is large, rough position alignment rather than minute position alignment is preferable since exact position alignment makes the layout look nice.

However, in the technique disclosed in JP-A-7-287771, the grid information is changed in only the unit of the divided region. Therefore, when text is arranged, a divided region in which the text will be arranged is determined, and grids are set at a minute interval in the divided region. When an image is arranged, a divided region in which the image will be arranged is determined, and grids are set at a rough interval in the divided region, which results in a complicated layout operation. When the position or type of layout element is changed, it is necessary to perform a setting operation whenever the position or type of the layout element is changed.

In addition, a complicated layout operation should be performed when the size of the layout element is changed. In this case, the user should determine whether the size of the layout element is large or small, and set an interval between grids. Since there is no precise criterion to determine whether the size of the layout element is large or small, the user determines the size of the layout element with his senses or experience.

In the cases of the type and the size of the layout element, the user should determine the interval between the grids by his senses or experience. Therefore, a user who is not accustomed to the layout cannot realize a layout having a good visible quality.

SUMMARY

An advantage of some aspects of the invention is that it provides a layout system, a layout program, and a layout method capable of reducing the labor required for a layout operation and making the layout look nice.

According to a first aspect of the invention, there is provided a layout system that sets a plurality of reference points or reference lines in a layout region and arranges a layout element in the layout region using the positions of the reference points or the reference lines as reference positions. The layout system includes: a reference position information storage unit that stores reference position information for defining the positions of the plurality of reference points or reference lines and layout element attribute information for defining an attribute of the layout element such that the reference position information and the layout element attribute information are associated with each other; a layout element acquiring unit that acquires the layout element; a layout element attribute information acquiring unit that acquires the layout element attribute information; a reference position information searching unit that searches the reference position information corresponding to the layout element attribute information acquired by the layout element attribute information acquiring unit from the reference position information storage unit; and a layout element arranging unit that arranges the layout element acquired by the layout element acquiring unit in the layout region by using the positions of the reference points or the reference lines as the reference positions, on the basis of the reference position information searched by the reference position information searching unit.

According the above-mentioned structure, the layout element and the layout element attribute information are acquired by the layout element acquiring unit and the layout element attribute information acquiring unit, respectively, and the reference position information corresponding to the acquired layout element attribute information is searched from the reference position information storage unit by the reference position information searching unit. Then, the layout element arranging unit arranges the acquired layout element in the layout region by using the positions of the reference points or the reference lines as reference positions, on the basis of the searched reference position information.

In this way, the positions of the reference points or the reference lines are changed according to the attribute of the layout element, which makes it possible to perform a layout operation without considering the attribute of the layout element. Therefore, it is possible to reduce the labor required for a layout operation and to make the layout look nice for a user who is not accustomed to the layout, as compared with the related art.

The layout elements include a text, a table, an image, a photograph, a figure, a graph, a footnote, a running title, pagination, a title, and others capable of forming the layout, which is similarly applied to a layout program of a seventeenth aspect and a layout method of a thirty-third aspect.

The layout means a display layout when the layout is displayed on a screen, and the layout means a printing layout when the layout is printed on a sheet. This is similarly applied to the layout program of the seventeenth aspect and the layout method of the thirty-third aspect.

The layout element arranging unit may have any structure as long as it can arrange the layout element using the positions of the reference points or the reference lines as reference positions. For example, the user may operate the layout element arranging unit to arrange the layout element, or the layout element arranging unit may automatically arrange the layout element. The layout element acquiring unit may have any structure as long as it can acquire the layout element. For example, the layout element acquiring unit may receive the layout element input through, for example, an input device, or acquire or receive the layout element from an external apparatus. Alternatively, the layout element acquiring unit may read out the layout element from a storage device or a storage medium. Therefore, the acquiring of the layout element includes at least the input, the acquiring, the reception, and the reading of the layout element. The above is similarly applied to the layout element attribute information acquiring unit and other acquiring units.

The reference position information storage unit stores the reference position information with all means and for all periods. The reference position information storage unit may store the reference position information beforehand, or it may store the reference position information input from the outside through an input device during the operation of the system, without storing the reference position information beforehand. This is similarly applied to the layout program of the seventeenth aspect and the layout method of the thirty-third aspect.

The system may be formed of, for example, a single apparatus, a terminal and other devices, or it may be composed of, for example, a network system in which a plurality of apparatuses, terminals and other devices are connected to each other such that they can communicate with each other. In the latter case, when components are connected to each other such that they can communicate with each other, the components may belong to one of the plurality of apparatuses.

According to a second aspect of the invention, in the layout system according to the first aspect, preferably, the layout element attribute information includes information for defining the size of the layout element.

According to the above-mentioned structure, the reference position information searching unit searches the reference position information corresponding to the size of the layout element, and the layout element arranging unit arranges the layout element on the basis of the searched reference position information.

In this way, the positions of the reference points or the reference lines are changed according to the size of the layout element, which makes it possible to perform a layout operation without considering the size of the layout element.

According to a third aspect of the invention, in the layout system according to the second aspect, preferably, the reference position information storage unit stores the reference position information having an interval between the reference points or the reference lines as a first interval and the layout element attribute information for defining a first size such that the reference position information and the layout element attribute information are associated with each other. In addition, preferably, the reference position information storage unit stores the reference position information having an interval between the reference points or the reference lines as a second interval that is larger than the first interval and the layout element attribute information for defining a second size larger than the first size such that the reference position information and the layout element attribute information are associated with each other.

According to the above-mentioned structure, when the size of the layout element is the second size, the reference position information searching unit searches the reference position information having the interval between the reference points or the reference lines as the second interval, and the layout element arranging unit arranges the layout element on the basis of the searched reference position information.

In this way, when the size of the layout element is large, the interval between the reference points or the reference lines becomes large, which makes it possible to perform exact position alignment. As a result, it is possible to make the layout look nice.

According to a fourth aspect of the invention, in the layout system according to the first aspect, preferably, the layout element attribute information includes information for defining the type of layout element.

According to the above-mentioned structure, the reference position information searching unit searches the reference position information corresponding to the type of layout element, and the layout element arranging unit arranges the layout element on the basis of the searched reference position information.

In this way, the positions of the reference points or the reference lines are changed according to the type of layout element, which makes it possible to perform a layout operation without considering the type of layout element.

According to a fifth aspect of the invention, in the layout system according to the fourth aspect, preferably, the reference position information storage unit stores the reference position information having an interval between the reference points or the reference lines as a first interval and the reference position information having an interval between the reference points or the reference lines as a second interval that is larger than the first interval In addition, preferably, the reference position information storage unit stores the reference position information having the first interval and the layout element attribute information for defining a text or a table, which is one type of layout element, such that the reference position information and the layout element attribute information are associated with each other.

According to the above-mentioned structure, when the type of the layout element is a text or a table, the reference position information searching unit searches the reference position information having the interval between the reference points or the reference lines as the first interval, and the layout element arranging unit arranges the layout element on the basis of the searched reference position information.

In this way, when the type of the layout element is a text or a table, the interval between the reference points or the reference lines becomes small, which makes it possible to minutely adjust the positions of the reference points or the reference lines. As a result, it is possible to make the layout look nice.

According to a sixth aspect of the invention, in the layout system according to the fourth aspect, preferably, the reference position information storage unit stores the reference position information for defining the positions of the reference points or the reference lines as first positions and the layout element attribute information for defining a first type such that the reference position information and the layout element attribute information are associated with each other. In addition, preferably, the reference position information storage unit stores the reference position information for defining the positions of the reference points or the reference lines as second positions separated from the first positions within a predetermined range and the layout element attribute information for defining a second type, which is the type of layout element that is subordinate to the layout element of the first type such that the reference position information and the layout element attribute information are associated with each other.

According to the above-mentioned structure, when the type of the layout element is the first type, the reference position information searching unit searches the reference position information for defining the first positions, and the layout element arranging unit arranges the layout element on the basis of the searched reference position information. Therefore, the layout element is arranged with the first positions as reference positions.

When the type of the layout element is the second type, the reference position information searching unit searches the reference position information for defining the second positions separated from the first positions with a predetermined range, and the layout element arranging unit arranges the layout element on the basis of the searched reference position information. Therefore, the layout element is arranged close to the first positions.

In this way, a layout element subordinate to the layout element of the first type is arranged close to the layout element of the first type, and thus it is possible to represent the subordinate relationship between the layout elements by the layout.

According to a seventh aspect of the invention, in the layout system according to the fourth aspect, preferably, the reference position information includes information for defining an attachment position matched with the reference points or the reference lines in the region of the layout element, and the layout element arranging unit arranges the layout element such that the attachment position is matched with the reference points or the reference lines.

According to the above-mentioned structure, the layout element arranging unit arranges the layout element such that the attachment position is matched with the reference points or the reference lines.

According to an eighth aspect of the invention, in the layout system according to the seventh aspect, preferably, the reference position information storage unit stores the reference position information for defining the center of the layout element as the attachment position and the layout element attribute information for defining the type of layout element other than the text such that the reference position information and the layout element attribute information are associated with each other.

According to the above-mentioned structure, when the type of layout element is not a text, the reference position information searching unit searches the reference position information for defining the center of the layout element as the attachment position, and the layout element arranging unit arranges the layout element on the basis of the searched reference position information.

When the type of layout element is not a text, the reference points or the reference lines are matched with the center of the layout element. When a plurality of layout elements is arranged, it is possible to keep the entire balance of the layout.

Here, the center of the layout element includes the center, the upper middle, and the lower middle of the layout element (when a layout element has a rectangular shape, for example, the center of an upper side and the center of a lower side are included in the center of the layout element). This is similarly applied to a layout program of a twenty-fourth aspect and a layout method of a fortieth aspect.

According to a ninth aspect of the invention, in the layout system according to the seventh aspect, preferably, the reference position information storage unit stores the layout element attribute information for defining a first type and the reference position information for defining as the attachment position a first position facing a layout element, which is subordinate to the layout element of the first type, with respect to the center of the layout element such that the layout element attribute information and the reference position information are associated with each other. In addition, preferably, the reference position information storage unit stores the reference position information for defining as the attachment position a second position symmetric to the first position with respect to the center of the layout element and the layout element attribute information for defining the subordinate layout element as a second type such that the reference position information and the layout element attribute information are associated with each other.

According to the above-mentioned structure, when the type of the layout element is the first type, the reference position information searching unit searches the reference position information for defining a first position of a layout element of the second type facing the center of the layout element, and the layout element arranging unit arranges the layout element on the basis of the searched reference position information. Therefore, the layout element is arranged such that the first position is matched with the reference points or the reference lines.

When the type of the layout element is the second type, the reference position information searching unit searches the reference position information for defining the second position symmetric to the first position with respect to the center of the layout element, and the layout element arranging unit arranges the layout element on the basis of the searched reference position information. Therefore, the layout element is arranged such that the second position is matched with the reference points or the reference lines.

In this way, a layout element subordinate to the layout element of the first type is arranged close to the layout element of the first type, and thus it is possible to represent the subordinate relationship between the layout elements by the layout.

According to a tenth aspect of the invention, in the layout system according to the seventh aspect, preferably, the layout element attribute information includes alignment information of the layout element, and the reference position information includes information for defining the attachment position on the basis of the alignment information.

According to the above-mentioned structure, the reference position information searching unit searches the reference position information for defining the attachment position on the basis of the alignment information of the layout element, and the layout element arranging unit arranges the layout element on the basis of the searched reference position information.

In this way, for example, when the type of layout element is a text, a plurality of layout elements are arranged such that the alignment positions of the text (for example, left alignment, right alignment, center alignment, top alignment, and bottom alignment) are matched with the reference points or the reference lines. Therefore, when a plurality of layout elements is arranged, it is possible to keep the entire balance of the layout.

According to an eleventh aspect of the invention, in the layout system according to any one of the first to tenth aspects, preferably, the layout element arranging unit reduces or enlarges the size of the layout element such that at least two of the reference points or the reference lines are included in the region frame of the layout element.

According to the above-mentioned structure, the layout element arranging unit reduces or enlarges the size of the layout element such that at least two of the reference points or the reference lines are included in the region frame of the layout element.

In this way, it is easy to align the sizes of a plurality of layout elements, and thus it is possible to keep the entire balance of the layout.

According to a twelfth aspect of the invention, in the layout system according to the eleventh aspect, preferably, the layout element arranging unit reduces or enlarges the size of the layout element while maintaining an aspect ratio thereof.

According to the above-mentioned structure, the layout element arranging unit reduces or enlarges the size of the layout element while maintaining an aspect ratio thereof.

In this way, it is possible to make the layout look nice without changing the aspect ratio of the layout element.

According to a thirteenth aspect of the invention, in the layout system according to the eleventh or twelfth aspect, preferably, the layout element is an image, a photograph, a figure, or a graph.

According to the above-mentioned structure, the size of the layout element composed of an image, a photograph, a figure, or a graph is reduced or enlarged such that at least two of the reference points or the reference lines are included in the region frame of the layout element.

According to a fourteenth aspect of the invention, in the layout system according to the fourth aspect, preferably, the reference position information storage unit stores the layout element attribute information for defining an arrangement position of the layout element according to the type of layout element and the reference position information for defining only a position where the layout element will be arranged as the positions of the reference points or the reference lines such that the layout element attribute information and the reference position information are associated with each other.

According to the above-mentioned structure, when the arrangement position of each type of layout element is determined, the reference position information searching unit searches reference position information for defining only a position where the layout element will be arranged as the positions of the reference points or the reference lines, and the layout element arranging unit arranges the layout element on the basis of the searched reference position information.

In this way, when the arrangement position of each type of layout element is determined, the layout element can be arranged at only a specified position. As a result, it is possible to make the layout look nice.

According to a fifteenth aspect of the invention, in the layout system according to the fourteenth aspect, preferably, the reference position information storage unit stores the layout element attribute information for defining a footnote, a running title, or pagination as the type of layout element and the reference position information for defining only a position where the footnote, the running title, or the pagination will be arranged as the positions of the reference points or the reference lines such that the layout element attribute information and the reference position information are associated with each other.

According to the above-mentioned structure, when the type of layout element is a footnote, a running title, or pagination, the reference position information searching unit searches reference position information for defining only a position where the footnote, the running title, or the pagination will be arranged, and the layout element arranging unit arranges the layout element on the basis of the searched reference position information.

In this way, when the type of layout element is a footnote, a running title, or pagination, the layout element can be arranged at only a specified position. As a result, it is possible to make the layout look nice.

According to a sixteenth aspect of the invention, in the layout system according to the seventh aspect, preferably, the reference position information storage unit stores the reference position information for defining the attachment position changed according to the positions of the reference points or the reference lines and the layout element attribute information for defining a footnote, a running title, or pagination as the type of layout element such that the layout element attribute information and the reference position information are associated with each other.

According to the above-mentioned structure, when the type of layout element is a footnote, a running title, or pagination, the reference position information searching unit searches reference position information for defining the attachment position changed according to the positions of the reference points or the reference lines, and the layout element arranging unit arranges the layout element on the basis of the searched reference position information.

In this way, the attachment position is changed according to the positions of the reference points or the reference lines to be attached. Therefore, it is possible to make the layout look nice.

According to a seventeenth aspect of the invention, in the layout system according to the fourth aspect, preferably, the reference position information storage unit stores the reference position information having an interval between the reference points or the reference lines as a first interval and the reference position information having an interval between the reference points or the reference lines as a second interval that is larger than the first interval. In addition, preferably, the reference position information storage unit stores the reference position information having the second interval and the layout element attribute information for defining a title, which is one type of layout element, such that the reference position information and the layout element attribute information are associated with each other.

According to the above-mentioned structure, when the type of layout element is a title, the reference position information searching unit searches the reference position information having the interval between the reference points or the reference lines as the second interval, and the layout element arranging unit arranges the layout element on the basis of the searched reference position information.

In this way, when the type of layout element is a title, the interval between the reference points or the reference lines becomes large, which makes it possible to perform exact position alignment. As a result, it is possible to make the layout look nice.

According to an eighteenth aspect of the invention, in the layout system according to the fourth aspect, preferably, the layout element attribute information includes information for defining an interval between rows when the layout element includes a text.

According to the above-mentioned structure, when the type of layout element includes a text, the reference position information searching unit searches reference position information corresponding to the interval between rows of the text, and the layout element arranging unit arranges the layout element on the basis of the searched reference position information.

In this way, the positions of the reference points or the reference lines are changed according to the interval between rows of the text included in the layout element. Therefore, it is possible to perform a layout operation without considering the interval between rows of the text.

According to a nineteenth aspect of the invention, in the layout system according to the eighteenth aspect, preferably, the reference position information searching unit searches from the reference position information storage unit reference position information in which the interval between the reference points or the reference lines is 'a/b' times larger than the interval between the rows ('a' and 'b' are integers) and the sum of 'a' and 'b' is a minimum value.

According to the above-mentioned structure, in a case in which the reference position information corresponding to the interval between the rows is not stored in the reference position information storage unit, when the layout element includes text, the reference position information searching unit searches reference position information in which the interval between the reference points or the reference lines is 'a/b' times larger than the interval between rows of the text ('a' and 'b' are integers) and the sum of 'a' and 'b' is a minimum value. The layout element arranging unit arranges the layout element on the basis of the searched reference position information.

In this way, in a case in which the layout element includes text, even when there is no reference position information corresponding to the interval between rows of the text, the reference points or the reference lines arranged at an interval that is closest to the interval between the rows of the text or is N (N is an integer) times larger than the interval between the rows are used. Therefore, when the rows of text are arranged at various intervals, it is possible to perform a layout operation without considering the interval between the rows of the text.

According to a twentieth aspect of the invention, in the layout system according to the fourth aspect, preferably, the layout element attribute information includes information for defining a character type when the layout element is a text.

According to the above-mentioned structure, the reference position information searching unit searches reference position information corresponding to a character type when the layout element includes a text, and the layout element arranging unit arranges the layout element on the basis of the searched reference position information In this way, when the layout element includes the text, the positions of the reference points or the reference lines are changed according to the character type. Therefore, it is possible to perform a layout operation without considering the character type of text.

According to a twenty-first aspect of the invention, in the layout system according to the twentieth aspect, preferably, the reference position information storage unit stores the reference position information having a larger interval between the reference points or the reference lines of the layout element having a specific character type than that of a layout element having a character type other than the specific character type and the layout element attribute information for defining the specific character type such that the reference position information and the layout element attribute information are associated with each other.

According to the above-mentioned structure, the reference position information searching unit searches the reference position information having a larger interval between the reference points or the reference lines of the layout element having a specific character type when the layout element includes a text than that of a layout element having a character type other than the specific character type, and the layout element arranging unit arranges the layout element on the basis of the searched reference position information.

In this way, when the layout element includes a text, a larger interval between the reference points or the reference lines of the text having a specific character type than that of a text having a character type other than the specific character type is used. It is possible to neatly lay out a specific character type, such as a large character type or a serif type, having a larger size (bolder) than a standard character type.

According to a twenty-second aspect of the invention, there is provided a layout program that sets a plurality of reference points or reference lines in a layout region and arranges a layout element in the layout region using the positions of the reference points or the reference lines as reference positions. The layout program includes a program that allows a computer to execute: acquiring the layout element; acquiring layout element attribute information for defining an attribute of the layout element; searching reference position information corresponding to the layout element attribute information acquired in the acquiring of the layout element attribute information from a reference position information storage unit that stores the reference position information for defining the positions of the plurality of reference points or reference lines and the layout element attribute information such that the reference position information and the layout element attribute information are associated with each other; and arranging the layout element acquired in the acquiring of the layout element in the layout region by using the positions of the reference points or the reference lines as the reference positions, on the basis of the reference position information searched in the searching of the reference position information.

According to the above-mentioned structure, when the computer reads out the program and then performs processes according to the read program, the same operations and effects as those in the layout system according to the first aspect are obtained.

Here, the arranging of the layout element may be performed in any manner as long as the layout element can be arranged with the positions of the reference points or the reference lines as reference positions. For example, the layout element may be arranged by the operation of a user, or the layout element may be automatically arranged. This is similarly applied to a layout method of the thirty-third aspect.

According to a twenty-third aspect of the invention, in the layout program according to the twenty-second aspect, preferably, the layout element attribute information includes information for defining the size of the layout element.

According to the above-mentioned structure, when the computer reads out the program and then performs processes according to the read program, the same operations and effects as those in the layout system according to the second aspect are obtained.

According to a twenty-fourth aspect of the invention, in the layout program according to the twenty-third aspect, preferably, the reference position information storage unit stores the reference position information having an interval between the reference points or the reference lines as a first interval and the layout element attribute information for defining a first size such that the reference position information and the layout element attribute information are associated with each other. In addition, preferably, the reference position information storage unit stores the reference position information having an interval between the reference points or the reference lines as a second interval that is larger than the first interval and the layout element attribute information for defining a second size larger than the first size such that the reference position information and the layout element attribute information are associated with each other.

According to the above-mentioned structure, when the computer reads out the program and then performs processes according to the read program, the same operations and effects as those in the layout system according to the third aspect are obtained.

According to a twenty-fifth aspect of the invention, in the layout program according to the twenty-second aspect, preferably, the layout element attribute information includes information for defining the type of layout element.

According to the above-mentioned structure, when the computer reads out the program and then performs processes according to the read program, the same operations and effects as those in the layout system according to the fourth aspect are obtained.

According to a twenty-sixth aspect of the invention, in the layout program according to the twenty-fifth aspect, preferably, the reference position information storage unit stores the reference position information having an interval between the reference points or the reference lines as a first interval and the reference position information having an interval between the reference points or the reference lines as a second interval that is larger than the first interval. In addition, preferably, the reference position information storage unit stores the reference position information having the first interval and the layout element attribute information for defining a text or a table, which is one type of layout element, such that the reference position information and the layout element attribute information are associated with each other.

According to the above-mentioned structure, when the computer reads out the program and then performs processes according to the read program, the same operations and effects as those in the layout system according to the fifth aspect are obtained.

According to a twenty-seventh aspect of the invention, in the layout program according to the twenty-fifth aspect, preferably, the reference position information storage unit stores the reference position information for defining the positions of the reference points or the reference lines as first positions and the layout element attribute information for defining a first type such that the reference position information and the layout element attribute information are associated with each other. In addition, preferably, the reference position information storage unit stores the reference position information for defining the positions of the reference points or the reference lines as second positions separated from the first positions within a predetermined range and the layout element attribute information for defining a second type, which is the type of layout element that is subordinate to the layout element of the first type such that the reference position information and the layout element attribute information are associated with each other.

According to the above-mentioned structure, when the computer reads out the program and then performs processes according to the read program, the same operations and effects as those in the layout system according to the sixth aspect are obtained.

According to a twenty-eighth aspect of the invention, in the layout program according to the twenty-fifth aspect, preferably, the reference position information includes information for defining an attachment position matched with the reference points or the reference lines in the region of the layout element, and the arranging of the layout element arranges the layout element such that the attachment position is matched with the reference points or the reference lines.

According to the above-mentioned structure, when the computer reads out the program and then performs processes according to the read program, the same operations and effects as those in the layout system according to the seventh aspect are obtained.

According to a twenty-ninth aspect of the invention, in the layout program according to the twenty-eighth aspect, preferably, the reference position information storage unit stores the reference position information for defining the center of the layout element as the attachment position and the layout element attribute information for defining the type of layout element other than the text such that the reference position information and the layout element attribute information are associated with each other.

According to the above-mentioned structure, when the computer reads out the program and then performs processes according to the read program, the same operations and effects as those in the layout system according to the eighth aspect are obtained.

According to a thirtieth aspect of the invention, in the layout program according to the twenty-eighth aspect, preferably, the reference position information storage unit stores the layout element attribute information for defining a first type and the reference position information for defining as the attachment position a first position of a layout element, which is subordinate to the layout element of the first type, facing the center of the layout element such that the layout element attribute information and the reference position information are associated with each other. In addition, preferably, the reference position information storage unit stores the reference position information for defining as the attachment position a second position symmetric to the first position with respect to the center of the layout element and the layout element attribute information for defining the subordinate layout element as a second type such that the reference position information and the layout element attribute information are associated with each other.

According to the above-mentioned structure, when the computer reads out the program and then performs processes according to the read program, the same operations and effects as those in the layout system according to the ninth aspect are obtained.

According to a thirty-first aspect of the invention, in the layout program according to the twenty-eighth aspect, preferably, the layout element attribute information includes alignment information of the layout element, and the reference position information includes information for defining the attachment position on the basis of the alignment information.

According to the above-mentioned structure, when the computer reads out the program and then performs processes according to the read program, the same operations and effects as those in the layout system according to the tenth aspect are obtained.

According to a thirty-second aspect of the invention, in the layout program according to any one of the twenty-second to thirty-first aspects, preferably, the arranging of the layout element reduces or enlarges the size of the layout element such that at least two of the reference points or the reference lines are included in the region frame of the layout element.

According to the above-mentioned structure, when the computer reads out the program and then performs processes according to the read program, the same operations and effects as those in the layout system according to the eleventh aspect are obtained.

According to a thirty-third aspect of the invention, in the layout program according to the thirty-second aspect, preferably, the arranging of the layout element reduces or enlarges the size of the layout element while maintaining an aspect ratio thereof.

According to the above-mentioned structure, when the computer reads out the program and then performs processes according to the read program, the same operations and effects as those in the layout system according to the twelfth aspect are obtained.

According to a thirty-fourth aspect of the invention, in the layout program according to the thirty-second or thirty-third aspect, preferably, the layout element is an image, a photograph, a figure, or a graph.

According to the above-mentioned structure, when the computer reads out the program and then performs processes according to the read program, the same operations and effects as those in the layout system according to the thirteenth aspect are obtained.

According to a thirty-fifth aspect of the invention, in the layout program according to the twenty-fifth aspect, preferably, the reference position information storage unit stores the layout element attribute information for defining an arrangement position of the layout element according to the type of layout element and the reference position information for defining only a position where the layout element will be arranged as the positions of the reference points or the reference lines such that the layout element attribute information and the reference position information are associated with each other.

According to the above-mentioned structure, when the computer reads out the program and then performs processes according to the read program, the same operations and effects as those in the layout system according to the fourteenth aspect are obtained.

According to a thirty-sixth aspect of the invention, in the layout program according to the thirty-fifth aspect, preferably, the reference position information storage unit stores the layout element attribute information for defining a footnote, a running title, or pagination as the type of layout element and the reference position information for defining only a position where the footnote, the running title, or the pagination will be arranged as the positions of the reference points or the reference lines such that the layout element attribute information and the reference position information are associated with each other.

According to the above-mentioned structure, when the computer reads out the program and then performs processes according to the read program, the same operations and effects as those in the layout system according to the fifteenth aspect are obtained.

According to a thirty-seventh aspect of the invention, in the layout program according to the twenty-eighth aspect, preferably, the reference position information storage unit stores the reference position information for defining the attachment position changed according to the positions of the reference points or the reference lines and the layout element attribute information for defining a footnote, a running title, or pagination as the type of layout element such that the layout element attribute information and the reference position information are associated with each other.

According to the above-mentioned structure, when the computer reads out the program and then performs processes according to the read program, the same operations and effects as those in the layout system according to the sixteenth aspect are obtained.

According to a thirty-eighth aspect of the invention, in the layout program according to the twenty-fifth aspect, preferably, the reference position information storage unit stores the reference position information having an interval between the reference points or the reference lines as a first interval and the reference position information having an interval between the reference points or the reference lines as a second interval that is larger than the first interval. In addition, preferably, the reference position information storage unit stores the reference position information having the second interval and the layout element attribute information for defining a title, which is one type of layout element, such that the reference position information and the layout element attribute information are associated with each other.

According to the above-mentioned structure, when the computer reads out the program and then performs processes according to the read program, the same operations and effects as those in the layout system according to the seventeenth aspect are obtained.

According to a thirty-ninth aspect of the invention, in the layout program according to the twenty-fifth aspect, preferably, the layout element attribute information includes information for defining an interval between rows when the layout element includes a text.

According to the above-mentioned structure, when the computer reads out the program and then performs processes according to the read program, the same operations and effects as those in the layout system according to the eighteenth aspect are obtained.

According to a fortieth aspect of the invention, in the layout program according to the thirty-ninth aspect, preferably, the searching of the reference position information searches from the reference position information storage unit reference position information in which the interval between the reference points or the reference lines is 'a/b' times larger than the interval between the rows ('a' and 'b' are integers) and the sum of 'a' and 'b' is a minimum value.

According to the above-mentioned structure, when the computer reads out the program and then performs processes according to the read program, the same operations and effects as those in the layout system according to the nineteenth aspect are obtained.

According to a forty first aspect of the invention; in the layout program according to the twenty-fifth aspect, preferably, the layout element attribute information includes information for defining a character type when the layout element includes a text.

According to the above-mentioned structure, when the computer reads out the program and then performs processes according to the read program, the same operations and effects as those in the layout system according to the twentieth aspect are obtained.

According to a forty second aspect of the invention, in the layout program according to the forty-first aspect, preferably, the storing of reference position information stores the reference position information having a larger interval between the reference points or the reference lines of the layout element having a specific character type than that of a layout element having a character type other than the specific character type and the layout element attribute information for defining the specific character type such that the reference position information and the layout element attribute information are associated with each other.

According to the above-mentioned structure, when the computer reads out the program and then performs processes according to the read program, the same operations and effects as those in the layout system according to the twenty-first aspect are obtained.

According to a forty-third aspect of the invention, a computer readable storage medium includes the layout program according to any one of the twenty-second to forty-second aspects stored therein.

In this way, it is possible to easily and reliably provide to, for example, a user the layout program according to the twenty-second to forty-second aspects through a computer readable storage medium, such as a CD-ROM, a DVD-ROM, an FD, or a semiconductor chip.

According to a forty-fourth aspect of the invention, there is provided a layout method that sets a plurality of reference points or reference lines in a layout region and arranges a layout element in the layout region using the positions of the reference points or the reference lines as reference positions. The layout includes: acquiring the layout element; acquiring layout element attribute information for defining an attribute of the layout element; searching reference position information corresponding to the layout element attribute information acquired in the acquiring of the layout element attribute information from a reference position information storage unit that stores the reference position information for defining the positions of the plurality of reference points or reference lines and the layout element attribute information such that the reference position information and the layout element attribute information are associated with each other; and arranging the layout element acquired in the acquiring of the layout element in the layout region by using the positions of the reference points or the reference lines as the reference positions, on the basis of the reference position information searched in the searching of the reference position information.

According to this aspect, it is possible to obtain the same effects as those in the layout system according to the first aspect.

According to a forty-fifth aspect of the invention, in the layout method according to the forty-fourth aspect, preferably, the layout element attribute information includes information for defining the size of the layout element.

According to this aspect, it is possible to obtain the same effects as those in the layout system according to the second aspect.

According to a forty-sixth aspect of the invention, in the layout method according to the forty-fifth aspect, preferably, the reference position information storage unit stores the reference position information having an interval between the reference points or the reference lines as a first interval and the layout element attribute information for defining a first size such that the reference position information and the layout element attribute information are associated with each other. In addition, preferably, the reference position information storage unit stores the reference position information having an interval between the reference points or the reference lines as a second interval that is larger than the first interval and the layout element attribute information for defining a second size larger than the first size such that the reference position information and the layout element attribute information are associated with each other.

According to this aspect, it is possible to obtain the same effects as those in the layout system according to the third aspect.

According to a forty-seventh aspect of the invention, in the layout method according to the forty-fourth aspect, preferably, the layout element attribute information includes information for defining the type of layout element.

According to this aspect, it is possible to obtain the same effects as those in the layout system according to the fourth aspect.

According to a forty-eighth aspect of the invention, in the layout method according to the forty-seventh aspect, preferably, the reference position information storage unit stores the reference position information having an interval between the reference points or the reference lines as a first interval and the reference position information having an interval between the reference points or the reference lines as a second interval that is larger than the first interval. In addition, preferably, the reference position information storage unit stores the reference position information having the first interval and the layout element attribute information for defining a text or a table, which is one type of layout element, such that the reference position information and the layout element attribute information are associated with each other.

According to this aspect, it is possible to obtain the same effects as those in the layout system according to the fifth aspect.

According to a forty-ninth aspect of the invention, in the layout method according to the forty-seventh aspect, preferably, the reference position information storage unit stores the reference position information for defining the positions of the reference points or the reference lines as first positions and the layout element attribute information for defining a first type such that the reference position information and the layout element attribute information are associated with each other. In addition, preferably, the reference position information storage unit stores the reference position information for defining the positions of the reference points or the reference lines as second positions separated from the first positions within a predetermined range and the layout element attribute information for defining a second type, which is the type of layout element that is subordinate to the layout element of the first type such that the reference position information and the layout element attribute information are associated with each other.

According to this aspect, it is possible to obtain the same effects as those in the layout system according to the sixth aspect.

According to a fiftieth aspect of the invention, in the layout method according to the forty-seventh aspect, preferably, the reference position information includes information for defining an attachment position matched with the reference points or the reference lines in the region of the layout element, and the arranging of layout element arranges the layout element such that the attachment position is matched with the reference points or the reference lines.

According to this aspect, it is possible to obtain the same effects as those in the layout system according to the seventh aspect.

According to a fifty-first aspect of the invention, in the layout method according to the fiftieth aspect, preferably, the reference position information storage unit stores the reference position information for defining the center of the layout element as the attachment position and the layout element attribute information for defining the type of layout element other than the text such that the reference position information and the layout element attribute information are associated with each other.

According to this aspect, it is possible to obtain the same effects as those in the layout system according to the eighth aspect.

According to a fifty-second aspect of the invention, in the layout method according to the fiftieth aspect, preferably, the reference position information storage unit stores the layout element attribute information for defining a first type and the reference position information for defining as the attachment position a first position of a layout element, which is subordinate to the layout element of the first type, facing the center of the layout element such that the layout element attribute information and the reference position information are associated with each other. In addition, preferably, the reference position information storage unit stores the reference position information for defining as the attachment position a second position symmetric to the first position with respect to the center of the layout element and the layout element attribute information for defining the subordinate layout element as a second type such that the reference position information and the layout element attribute information are associated with each other.

According to this aspect, it is possible to obtain the same effects as those in the layout system according to the ninth aspect.

According to a fifty-third aspect of the invention, in the layout method according to the fiftieth aspect, preferably, the layout element attribute information includes alignment information of the layout element, and the reference position information includes information for defining the attachment position on the basis of the alignment information.

According to this aspect, it is possible to obtain the same effects as those in the layout system according to the tenth aspect.

According to a fifty-fourth aspect of the invention, in the layout method according to any one of the forty-fourth to fifty-third aspects, preferably, the arranging of the layout element reduces or enlarges the size of the layout element such that at least two of the reference points or the reference lines are included in the region frame of the layout element.

According to this aspect, it is possible to obtain the same effects as those in the layout system according to the eleventh aspect.

According to a fifty-fifth aspect of the invention, in the layout method according to the fifty-fourth aspect, preferably, the arranging of the layout element reduces or enlarges the size of the layout element while maintaining an aspect ratio thereof.

According to this aspect, it is possible to obtain the same effects as those in the layout system according to the twelfth aspect.

According to a fifty-sixth aspect of the invention, in the layout method according to the fifty-fourth or fifty-fifth aspect, preferably, the layout element is an image, a photograph, a figure, or a graph.

According to this aspect, it is possible to obtain the same effects as those in the layout system according to the thirteenth aspect.

According to a fifty-seventh aspect of the invention, in the layout method according to the forty-seventh aspect, preferably, the reference position information storage unit stores the layout element attribute information for defining an arrangement position of the layout element according to the type of layout element and the reference position information for defining only a position where the layout element will be arranged as the positions of the reference points or the reference lines such that the layout element attribute information and the reference position information are associated with each other.

According to this aspect, it is possible to obtain the same effects as those in the layout system according to the fourteenth aspect.

According to a fifty-eighth aspect of the invention, in the layout method according to the fifty-seventh aspect, preferably, the reference position information storage unit stores the layout element attribute information for defining a footnote, a running title, or pagination as the type of layout element and the reference position information for defining only a position where the footnote, the running title, or the pagination will be arranged as the positions of the reference points or the reference lines such that the layout element attribute information and the reference position information are associated with each other.

According to this aspect, it is possible to obtain the same effects as those in the layout system according to the fifteenth aspect.

According to a fifty-ninth aspect of the invention, in the layout method according to the fiftieth aspect, preferably, the reference position information storage unit stores the reference position information for defining the attachment position changed according to the positions of the reference points or the reference lines and the layout element attribute information for defining a footnote, a running title, or pagination as the type of layout element such that the layout element attribute information and the reference position information are associated with each other.

According to this aspect, it is possible to obtain the same effects as those in the layout system according to the sixteenth aspect.

According to a sixtieth aspect of the invention, in the layout method according to the forty-seventh aspect, preferably, the reference position information storage unit stores the reference position information having an interval between the reference points or the reference lines as a first interval and the reference position information having an interval between the reference points or the reference lines as a second interval that is larger than the first interval. In addition, preferably, the reference position information storage unit stores the reference position information having the second interval and the layout element attribute information for defining a title, which is one type of layout element, such that the reference position information and the layout element attribute information are associated with each other.

According to this aspect, it is possible to obtain the same effects as those in the layout system according to the seventeenth aspect.

According to a sixty-first aspect of the invention, in the layout method according to the forty-seventh aspect, preferably, the layout element attribute information includes information for defining an interval between rows when the layout element includes a text.

According to this aspect, it is possible to obtain the same effects as those in the layout system according to the eighteenth aspect.

According to a sixty-second aspect of the invention, in the layout method according to the sixty-first aspect, preferably, the searching of the reference position information searches from the reference position information storage unit reference position information in which the interval between the reference points or the reference lines is 'a/b' times larger than the interval between the rows ('a' and 'b' are integers) and the sum of 'a' and 'b' is a minimum value.

According to this aspect, it is possible to obtain the same effects as those in the layout system according to the nineteenth aspect.

According to a sixty-third aspect of the invention, in the layout method according to the forty-seventh aspect, preferably, the layout element attribute information includes information for defining a character type when the layout element includes a text.

According to this aspect, it is possible to obtain the same effects as those in the layout system according to the twentieth aspect.

According to a sixty-fourth aspect of the invention, in the layout method according to the sixty-third aspect, preferably, the storing of reference position information stores the reference position information having a larger interval between the reference points or the reference lines of the layout element having a specific character type than that of a layout element having a character type other than the specific character type and the layout element attribute information for defining the specific character type such that the reference position information and the layout element attribute information are associated with each other.

According to this aspect, it is possible to obtain the same effects as those in the layout system according to the twenty-first aspect.

BRIEF DESCRIPTION OF THE DRAWINGS

The invention will be described with reference to the accompanying drawings, wherein like numbers refer to like elements.

FIGS. 4A and 4B are diagrams illustrating the data structure of first and second grid information items.

FIG. 5 is a diagram illustrating the display of grids based on the first and second grid information items

FIG. 13 is a diagram illustrating the display of grids based on the fifth and sixth grid information items.

FIGS. 16A to 16C are diagrams illustrating the data structure of seventh to ninth grid information items.

FIG. 17 is a diagram illustrating the display of grids based on the seventh to ninth grid information items.

FIG. 20 is a diagram illustrating the display of grids based on the tenth and eleventh grid information items.

FIGS. 24A and 24E are diagrams illustrating examples of standard character types, and FIGS. 24B to 24D and FIG. 24F are diagrams illustrating examples of specific character types.

DESCRIPTION OF EXEMPLARY EMBODIMENTS

Hereinafter, a first embodiment of the invention will be described below with reference to the accompanying drawings. FIGS. 1 to 9 are diagrams illustrating a layout system, a layout program, and a layout method according to the first embodiment of the invention.

In this embodiment of the invention, the layout system, the layout program, and the layout method are applied when an interval between grids is changed according to the size of content.

First, the function of a layout apparatus according to the embodiment of the invention will be schematically described.

Figure 1:
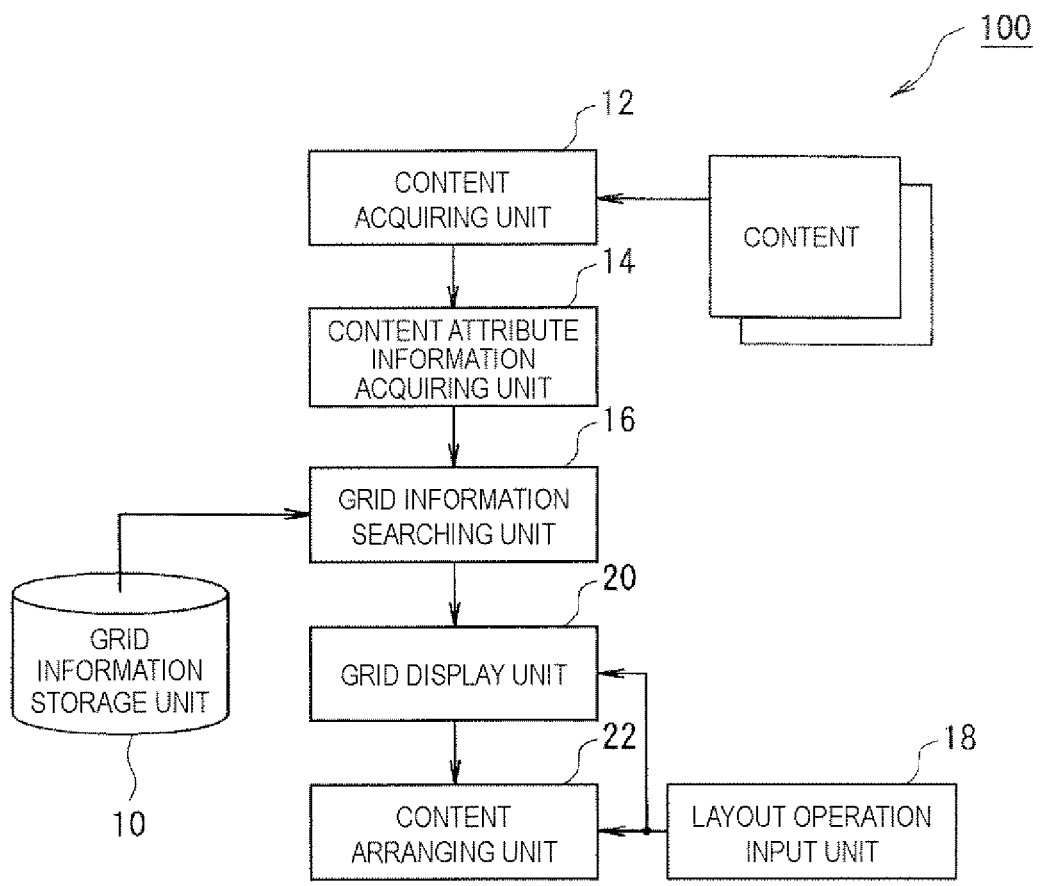
FIG. 1 is a functional block diagram schematically illustrating a layout apparatus 100.

FIG. 1 is a functional block diagram schematically illustrating a layout apparatus 100.

As shown in FIG. 1, the layout apparatus 100 includes a grid information storage unit 10 that stores grid information for defining coordinates of a plurality of grid points to be associated with content attribute information for defining the attribute of content, a content acquiring unit 12 for acquiring content, and a content attribute information acquiring unit 14 for acquiring the content attribute information from the content acquired by the content acquiring unit 12.

The layout apparatus 100 further includes: a grid information searching unit 16 for searching grid information corresponding to the content attribute information acquired by the content attribute information acquiring unit 14 from the grid information storage unit 10; and a layout operation input unit

18 for inputting a layout operation, such as the selection or movement of content, or a change in the size of content.

Also, the layout apparatus 100 further includes: a grid display unit 20 for displaying a grid on the basis of the grid information searched by the grid information searching unit 16 and the layout operation input through the layout operation input unit 18; and a content arranging unit 22 for arranging the content acquired by the content acquiring unit 12 in a layout region with a grid point used as a reference point, on the basis of the grid information searched by the grid information searching unit 16 and the layout operation input through the layout operation input unit 18.

Next, the structure of the layout apparatus 100 will be described below.

Figures 2, 3:
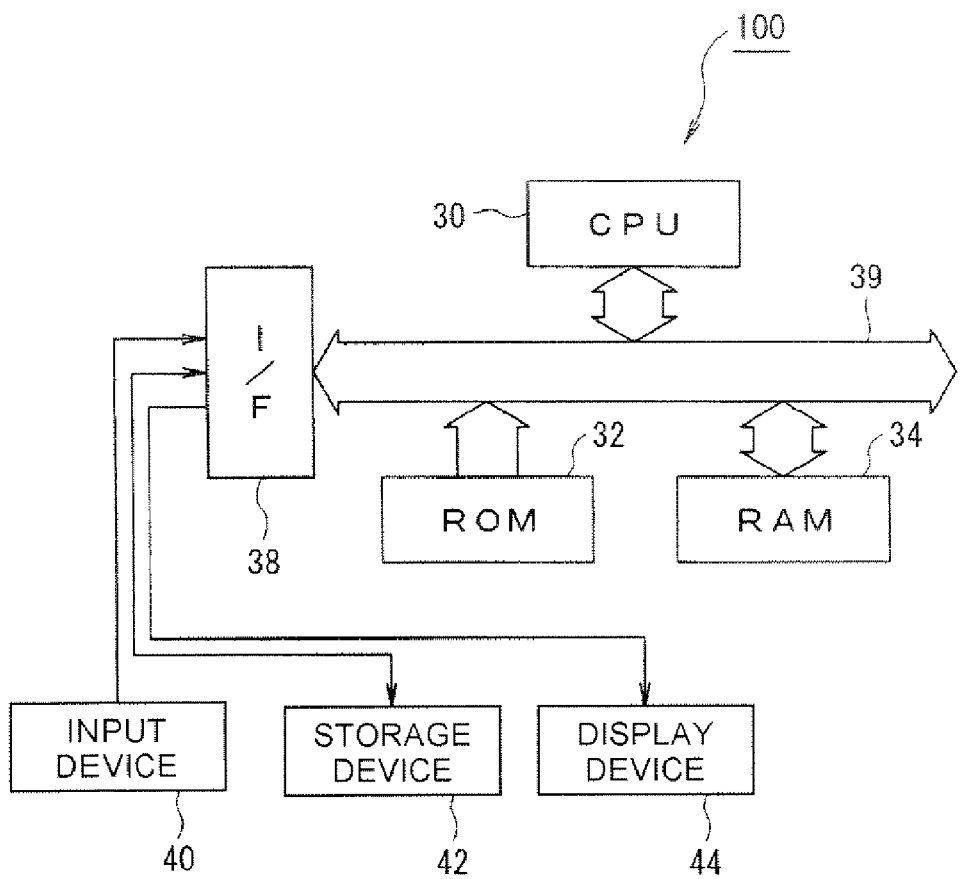
FIG. 2 is a diagram illustrating the hardware structure of the layout apparatus 100.
FIG. 3 is a diagram illustrating the data structure of grid information.

FIG. 2 is a diagram illustrating the hardware structure of the layout apparatus 100.

As shown in FIG. 2, the layout apparatus 100 includes a CPU 30 for controlling arithmetic operations and the entire systems on the basis of a control program, a ROM 32 for previously storing, for example, a control program for the CPU 30 in a predetermined region, a RAM 34 for storing data read out from, for example, the ROM 32 or the results of the arithmetic operations needed for the CPU 30 to perform arithmetic processing, and an I/F 38 for transmitting/receiving data to/from external devices. These components are connected to one another via a bus 39, which is a signal line to transmit data, so as to be capable of sending and receiving data.

External devices, such as an input device 40 composed of a keyboard or a mouse, serving as a human interface, capable of inputting data, a storage unit 42 for storing data or tables in the form of files, and a display device 44 for displaying an image on the basis of image signals, are connected to the I/F 38.

Next, the data structure of content will be described below.

The storage device 42 stores a plurality of contents.

The content is composed of, for example, text, a table, an image, a photograph, a figure, a graph, a title, a body, a footnote, a running title, pagination, and a caption. Here, the text, the table, the image, the photograph, the figure, and the graph belong to the data types of content, and the title, the body, the footnote, the running title, the pagination, and the caption belong to the types of elements in the structure obtained by hierarchically combining a plurality of contents. Since the type of data and the type of elements are independent attributes, for example, content of text and a title may exist, and content of an image and a title may exist.

Content includes content attribute information indicating attributes of content, such as the size of content, the type of data, and the type of elements. The size of content defines the height or width of content in the unit of points.

The content attribute information may be separately formed from content When the content attribute information is separately formed from content, the content attribute information may be associated with content. Any of the following methods can be used as a method of associating the content attribute information with content: a method of inserting information indicating the address of content attribute information, such as a file path or URL (uniform resource locator), into content; a method of inserting information indicating the address of content into content attribute information; and a method of providing a table having information indicating the addresses of content and content attribute information registered therein.

Next, the data structure of grid information will be described below.

The storage device 42 is formed of the grid information storage unit 10, and stores a plurality of grid information items.

FIG. 3 is a diagram illustrating the data structure of the grid information.

As shown in FIG. 3, the grid information includes a grid information identifier 400 for identifying grid information, a condition calculating expression 402 for defining the attribute of content to which the grid information is applied, and a grid coordinate information item 404.

The grid coordinate information item 404 includes a plurality of records. Each of the records includes a grid identifier 420 for identifying a grid, a start x coordinate 422 of a grid point, a start y coordinate 424 of the grid point, an interval 426 between grid points in an x direction, an interval 428 between grid points in a y direction, an end x coordinate 430 of a grid point, an end y coordinate 432 of the grid point, and an attachment position 434 that is matched with the grid point in a content region.

The horizontal direction of a layout region is referred to as the x direction, and the vertical direction thereof is referred to as the y direction. An upper left side of the layout region is used as the origin. The maximum value of the x coordinate is set to the right end of the layout region, and the maximum value of the y coordinate is set to the lower end of the layout region.

When a grid is set in the layout region, at least positive values are set to the start x coordinate 422, the start y coordinate 424, and the attachment position 434. When the x interval 426, the y interval 428, the end x coordinate 430, and the end y coordinate 432 are not used, negative values are set thereto.

When only the start x coordinate 422, the start y coordinate 424, and the attachment position 434 are set, the start x coordinate 422 and the start y coordinate 424 of only one grid point are set In addition, content is arranged such that the grid point is matched with the attachment position 434 of the content. The attachment position 434 can be set to any one of the upper left, the upper middle, the upper right, the middle left, the center, the middle right, the lower left, the lower middle, and the lower right of content. For example, when the upper left side is set as the attachment position 434, content is arranged such that the grid point is matched with the upper left side of the content. Actual data is represented in figures such that the upper left side=1, the upper middle side=2, and the lower middle side=8. However, in this embodiment, data is represented by a character string.

When the x interval 426 and the y interval 428 are further set, the start x coordinate 422 and the start y coordinate 424 are used as start points, the coordinates of the lower right side of the layout region are used as an end point, and one or more grid points are set at the x interval 426 and the y interval 428 in a rectangular region surrounded by the start points and the end point. When the start x coordinate 422 is referred to as 'xs', the start y coordinate 424 is referred to as 'ys', the x interval 426 is referred to as 'xp', and the y interval 428 is referred to as 'yp', the grid points have coordinates (xs, ys), (xs+xp, ys), (xs+2*xp, ys), . . . , (xs+n*xp, ys), (xs, ys+yp), . . . , (xs, ys+2*yp), . . . , (xs, ys+m*yp), . . . , (xs+n*xp, ys+m*yp). However, when the maximum value of the x coordinate is 'Xb' and the maximum value of the y coordinate is 'Yb', n=quot ((Xb−xs)/xp) and m=quot ((Yb−ys)/yp). The term 'quot' means a function for calculating the quotient of division.

When the end x coordinate 430 and the end y coordinate 432 are further set, the start x coordinate 422 and the start y coordinate 424 are used as start points, the end x coordinate 430 and the end y coordinate 432 are used as end points, and one or more grid points are set at the x interval 426 and the y interval 428 in a rectangular region surrounded by the start points and the end points. When the end x coordinate 430 is referred to as 'xe' and the end y coordinate 432 is referred to as 'ye', the grid points have coordinates (xs, ys), (xs+xp, ys), (xs+2*xp, ys), . . . , (xs+i*xp, ys), . . . , (xs, ys+yp), . . . , (xs, ys+2*yp), . . . , (xs, ys+j*yp), . . . , (xs+i*xp, ys+j*yp). Here, i=quot ((xe−xs)/xp), and j=quot ((ye−ys)/yp).

In this embodiment, two grid information items, that is, first and second grid information items, shown in FIGS. 4A and 4B are used.

FIGS. 4A and 4B are diagrams illustrating the data structure of the first and second grid information items.

As shown in FIG. 4A, the first grid information item is applied to the content having a size larger than a 12-point, and defines 12 grids. Each of grid numbers 1 to 12 defines one grid point. In addition, the upper left side is defined as the attachment position.

As shown in FIG. 4B, the second grid information item is applied to the content having a size equal to or smaller than a 12-point, and defines 48 grids. Each of grid numbers 1 to 48 defines one grid point. In addition, the upper left side is defined as the attachment position.

FIG. 5 is a diagram illustrating the display of grids based on the first and second grid information items.

As shown in FIG. 5, the first grid information includes 6 grid points arranged in the y direction at an interval of '36' with the coordinates (25, 20) used as a start point and 6 grid points arranged in the y direction at an interval of '36' with the coordinates (115, 20) used as a start point.

The second grid information includes 24 grid points arranged in the y direction at an interval of '9' with the coordinates (20, 20) used as a start point and 24 grid points arranged in the y direction at an interval of '9' with the coordinates (110, 20) used as a start point.

Therefore, the grid having a larger interval between the grid points is applied to the content having a size larger than a 12-point, and the grid having a smaller interval between the grid points is applied to the content having a size equal to or smaller than the 12-point.

When the interval between the grid points is small, a minute positional deviation occurs in a horizontal line aligned in the horizontal direction and at the left position aligned at the left side in the vertical direction. Accurate positional alignment rather than minute positional adjustment is performed on the content having a larger size in order to make the content look nice. Therefore, in this case, the grid having a large interval between the grid points is applied. In this way, it is possible to simplify a layout operation and to make a layout look nice.

Next, processes performed by the CPU 30 will be described below.

Figure 6:
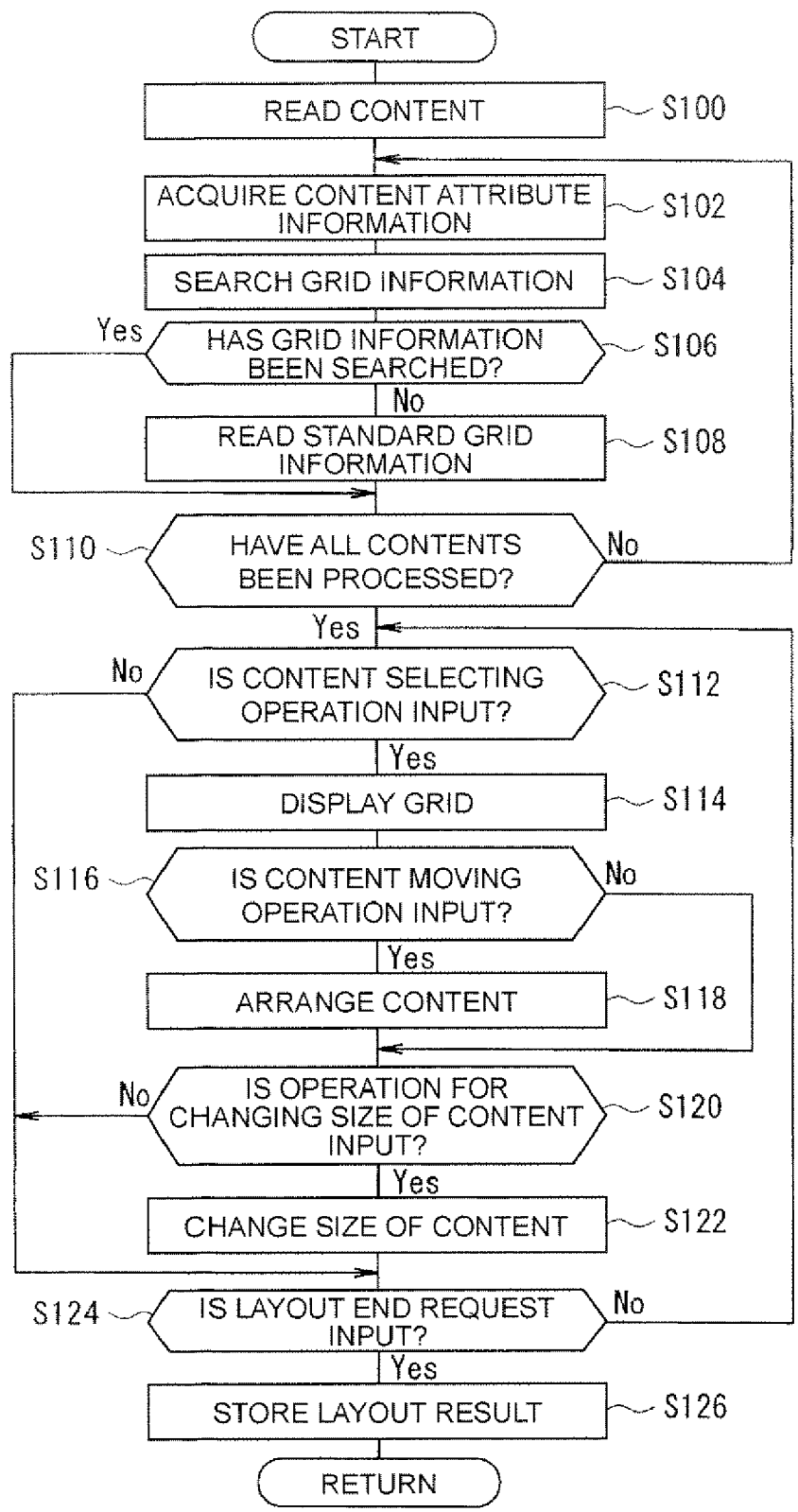
FIG. 6 is a flow chart illustrating a layout process.

The CPU 30 is composed of a micro processing unit and the like and executes a predetermined program stored in a given region of the ROM 32 to perform a layout process shown in a flow chart in FIG. 6 according to the program.

FIG. 6 is a flow chart illustrating the layout process.

As shown in FIG. 6, in the layout process performed by the CPU 30, first, step S100 is performed.

In step S100, one or more contents to be laid out are read from the storage device 42, and the process proceeds to step S102 to acquire content attribute information from the read content. Then, the process proceeds to step S104.

In step S104, grid information corresponding to the acquired content attribute information is searched from the storage device 42. For example, when the size of content is larger than a 12-point, the first grid information item is searched.

Next, the process proceeds to step S106 to determine whether the grid information is searched. When it is determined in step S106 that the grid information cannot be searched (the grid information does not exist) (No), the process proceeds to step S108 to read out default grid information from the storage device 42. Then, the process proceeds to step S110.

In step S110, it is determined whether steps S102 to S108 are completely performed on all the acquired contents. When it is determined that steps S102 to S108 are completely performed on all the acquired contents (Yes), the process proceeds to step S112.

In step S112, it is determined whether a layout operation for selecting content is input. When it is determined that the layout operation for selecting content is input (Yes), the process proceeds to step S114 to display a grid in the layout region on the basis of the searched grid information on the content selected by the layout operation. Then, the process proceeds to step S116.

In step S116, it is determined whether a layout operation for moving content is input. When it is determined that the layout operation for moving content is input (Yes), the process proceeds to step S118 to specify a grid point closest to the coordinates of the attachment position of the content in the destination of content designated by the layout operation and to match the specified grid point with the attachment position of the content selected by the layout operation, thereby arranging the content in the layout region. Then, the process proceeds to step S120.

In step S120, it is determined whether a layout operation for changing the size of content is input. When it is determined that the layout operation for changing the size of content is input (Yes), the process proceeds to step S122 to change the size of the content selected by the layout operation to the size of the content designated by the layout operation. Then, the process proceeds to step S124.

In step S124, it is determined whether a layout end request is input. When it is determined that the layout end request is input (Yes), the process proceeds to step S126 to store the layout result in the storage device 42. Then, a series of processes is terminated, and the process returns to the initial state.

Meanwhile, in step S120, when it is determined that the layout operation for changing the size of content is not input (No), the process proceeds to step S124.

In step S116, when it is determined that the layout operation for moving content is not input (No), the process proceeds to step S120.

In step S112, when it is determined that the layout operation for selecting content is not input (No), the process proceeds to step S124.

In step S110, when it is determined that steps S102 to S108 are not completely performed on all the acquired contents (No), the process proceeds to step S102.

In step S106, when it is determined that the grid information is searched (Yes), the process proceeds to step S110.

Next, the operation of this embodiment will be described below.

Figure 7:
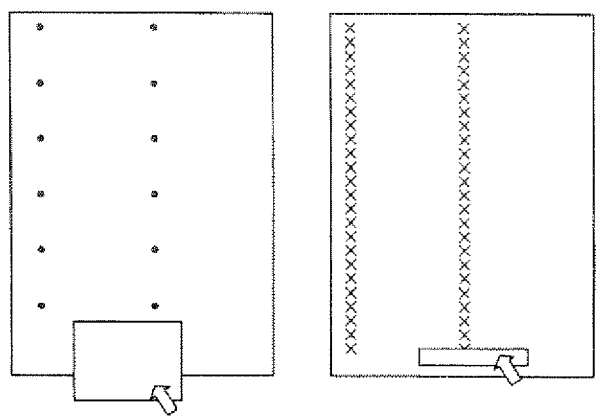
FIG. 7 is a diagram illustrating the display of grids changed according to the size of content.

FIG. 7 is a diagram illustrating the display of the grid changed according to the size of content.

In the layout apparatus 100, when a user creates or selects content by using the input device 40, the displayed grid is changed according to the size of content, as shown in FIG. 7. For example, when content having a size larger than a 12-point is created or selected, the first grid information item is searched through steps 104 and 114, and a grid having a large interval between grid points is displayed on the basis of the searched first grid information item, as shown on the left side of FIG. 7.

Figure 8:
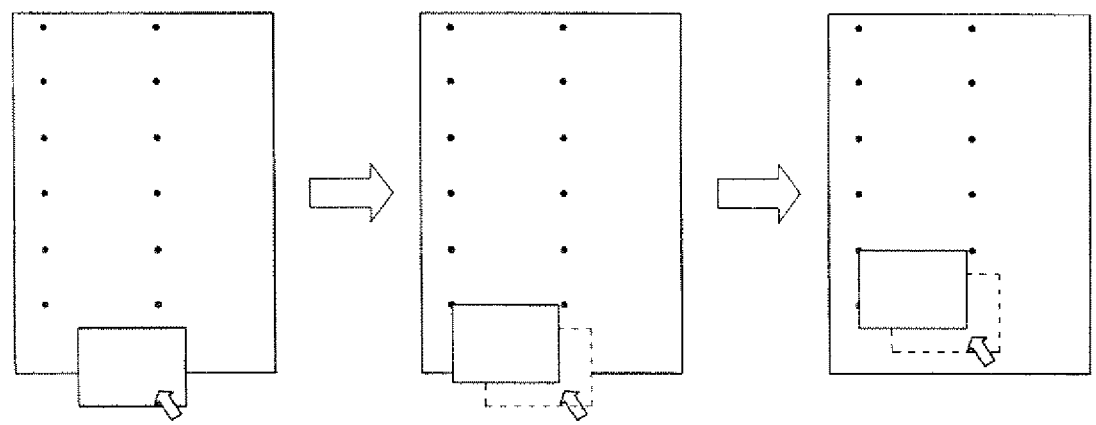
FIG. 8 is a diagram illustrating a layout operation when the size of content is large.

FIG. 8 is a diagram illustrating a layout operation when the size of content is large.

When content having a size larger than a 12-point moves, layout control is performed such that the content is attached to the grid having a large interval between the grid points, as shown in FIG. 8. When the user performs a layout operation to move the content, the content is arranged through step S118 such that the attachment position (the upper left side) of the content is matched with a grid point closest to the coordinates of the attachment position of the content in the destination of the content. In this state, when the user further moves the content, the content is arranged such that the attachment position of the content is matched with a grid point closest to the coordinates after movement.

When content having a size smaller than the 12-point is created or selected, the second grid information item is searched through steps 104 and 114, and a grid having a small interval between the grid points is displayed on the basis of the searched second grid information item, as shown on the right side of FIG. 7.

Figures 9, 10A, 10B, 10C:
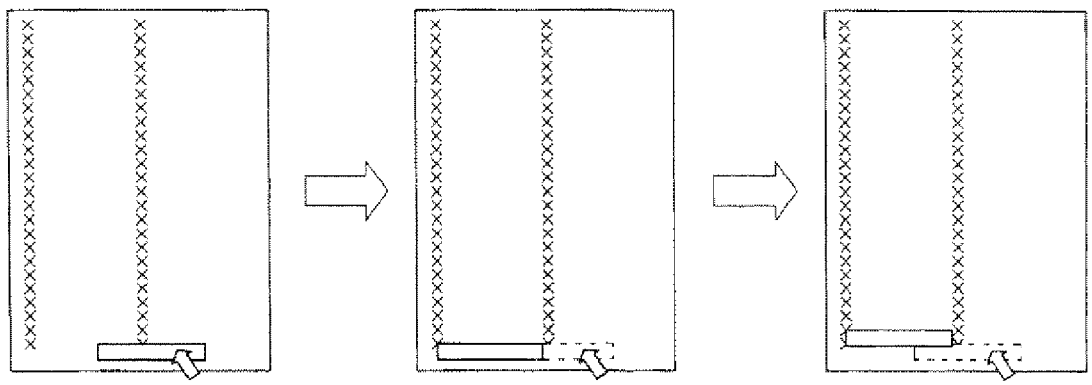
FIG. 9 is a diagram illustrating a layout operation when the size of content is small.
FIGS. 10A to 10C are diagrams illustrating the data structure of third to fifth grid information items.

FIG. 9 is a diagram illustrating a layout operation when the size of content is small.

When the user moves the content having a size smaller than the 12-point, layout control is performed such that the content is attached to a grid having a small interval between the grid points, as shown in FIG. 9. When the user performs a layout operation to move the content, the content is arranged through step S118 such that the attachment position (the upper left side) of the content is matched with a grid point closest to the coordinates of the attachment position of the content in the destination of the content. In this state, when the user further moves the content, the content is similarly arranged such that the attachment position of the content is matched with a grid point closest to the coordinates after movement.

Comparing FIG. 8 with FIG. 9, in FIG. 8, a cursor moves stepwise in response to a movement instruction relative to the movement of a pointing device, but, in FIG. 9, the cursor moves more smoothly than the cursor shown in FIG. 8 in response to the movement instruction.

Therefore, in this embodiment, content is acquired, and content attribute information is acquired from the acquired content. Then, grid information corresponding to the size of the content is searched from the storage device 42 on the basis of the acquired content attribute information, and the acquired content is arranged in a layout region with the position of a grid point used as a reference position, on the basis of the searched grid information.

In this way, the position of a grid point is changed according to the size of content, which makes it possible to perform a layout operation without considering the size of content. Therefore, it is possible to reduce the labor required for a layout operation, and thus to make a layout look nice for a user who is not accustomed to the layout, as compared with the related art.

Further, in this embodiment, the storage device 42 stores the second grid information item having an interval between grid points as a first interval and the content attribute information for defining the size of the content equal to or smaller than a 12-point such that the second grid information item and the content attribute information are associated with each other, and stores the first grid information item having an interval between grid points as a second interval that is larger than the first interval and the content attribute information for defining the size of the content larger than a 12-point such that the first grid information item and the content attribute information are associated with each other.

In this way, when the size of content is large, an interval between grid points becomes large, which makes it possible to perform accurate positional alignment. As a result, it is possible to make a layout look nice.

In the first embodiment, the grid information storage unit 10 and the storage device 42 correspond to a reference position information storage unit of a first, third, twenty-second, twenty-fourth, forty-fourth, or forty-sixth aspect. The content acquiring unit 12 and step S100 correspond to a layout element acquiring unit of the first aspect, and step S100 corresponds to a layout element acquiring step of the twenty-second or forty-fourth aspect. The content attribute information acquiring unit 14 and step S102 correspond to a layout element attribute information acquiring unit of the first aspect, and step S102 corresponds to a layout element attribute information acquiring step of the twenty-second or forty-fourth aspect. The grid information searching unit 16 and step S104 correspond to a reference position information searching unit of the first aspect.

In the first embodiment, step S104 corresponds to a reference position information searching step of the twenty-second or forty-fourth aspect, and the content arranging unit 22 and step S118 correspond to a layout element arranging unit of the first aspect. In addition, step S118 corresponds to a layout element arranging step of the twenty-second or forty-fourth aspect. The grid point corresponds to a reference point of the first, third, twenty-second, twenty-fourth, forty-fourth, or forty-sixth aspect, and the content corresponds to a layout element of the first, second, twenty-second, twenty-third, forty-fourth, or forty-fifth aspect. The content attribute information corresponds to layout element attribute information of the first to third aspects, the twenty-second to twenty-fourth aspects, and the forty-fourth to forty-sixth aspects.

In the first embodiment, the grid information corresponds to reference position information of the first, third, twenty-second, twenty-fourth, forty-fourth, or forty-sixth aspect.

Next, a second embodiment of the invention will be described with reference to the accompanying drawings. FIGS. 10 to 15 and FIGS. 23 to 27 are diagrams illustrating a layout system, a layout program, and a layout method according to the second embodiment of the invention.

In the second embodiment of the invention, the layout system, the layout program, and the layout method are applied when an interval between grids is changed according to the data type of content. In the second embodiment, only the components different from those in the first embodiment are described. In addition, in the second embodiment, the same components as those in the first embodiment have the same reference numerals, and a detail description thereof will be omitted.

First, the data structure of grid information will be described below.

In this embodiment, three grid information items, that is, third to fifth information items, shown in FIGS. 10A to 10C are used.

FIGS. 10A to 10C are diagrams illustrating the data structure of the third to fifth grid information items.

As shown in FIG. 10A, the third grid information item is applied when the data type of content is text, and defines 2 grids. Grid number 1 defines a plurality of grid points arranged in a rectangular region surrounded by a start point having start coordinates (25, 20) and an end point having the coordinates of the lower right of a layout region. The grid points are arranged at an interval of '90', in the x direction and an interval of '9' in the y direction. Grid number 2 defines a plurality of grid points arranged in a rectangular region surrounded by a start point having start coordinates (60, 20) and an end point having end coordinates (150, 47). The grid points are arranged at an interval of '90' in the x direction and an interval of '9' in the y direction. Both the grid numbers 1 and 2 define the upper left of the layout region as an attachment position. It is preferable that the interval between the grid points be equal to a pitch between characters and a pitch between rows.

As shown in FIG. 10B, the fourth grid information item is applied to when the data type of content is a table, and defines one grid. Grid number 1 defines a plurality of grid points arranged in a rectangular region surrounded by a start point having start coordinates (60, 20) and an end point having the coordinates of the lower right of a layout region. The grid points are arranged at an interval of '90' in the x direction and an interval of '36' in the y direction. The upper middle is defined as the attachment position.

As shown in FIG. 10C, the fifth grid information item is applied when the data type of content is an image, a photograph, a figure, or a graph, and defines one grid. Grid number 1 defines a plurality of grid points arranged in a rectangular region surrounded by a start point having start coordinates (60, 92) and an end point having the coordinates of the lower right of a layout region. The grid points are arranged at an interval of '90' in the x direction and an interval of '72' in the y direction. The lower middle is defined as the attachment position.

Figures 11, 12:
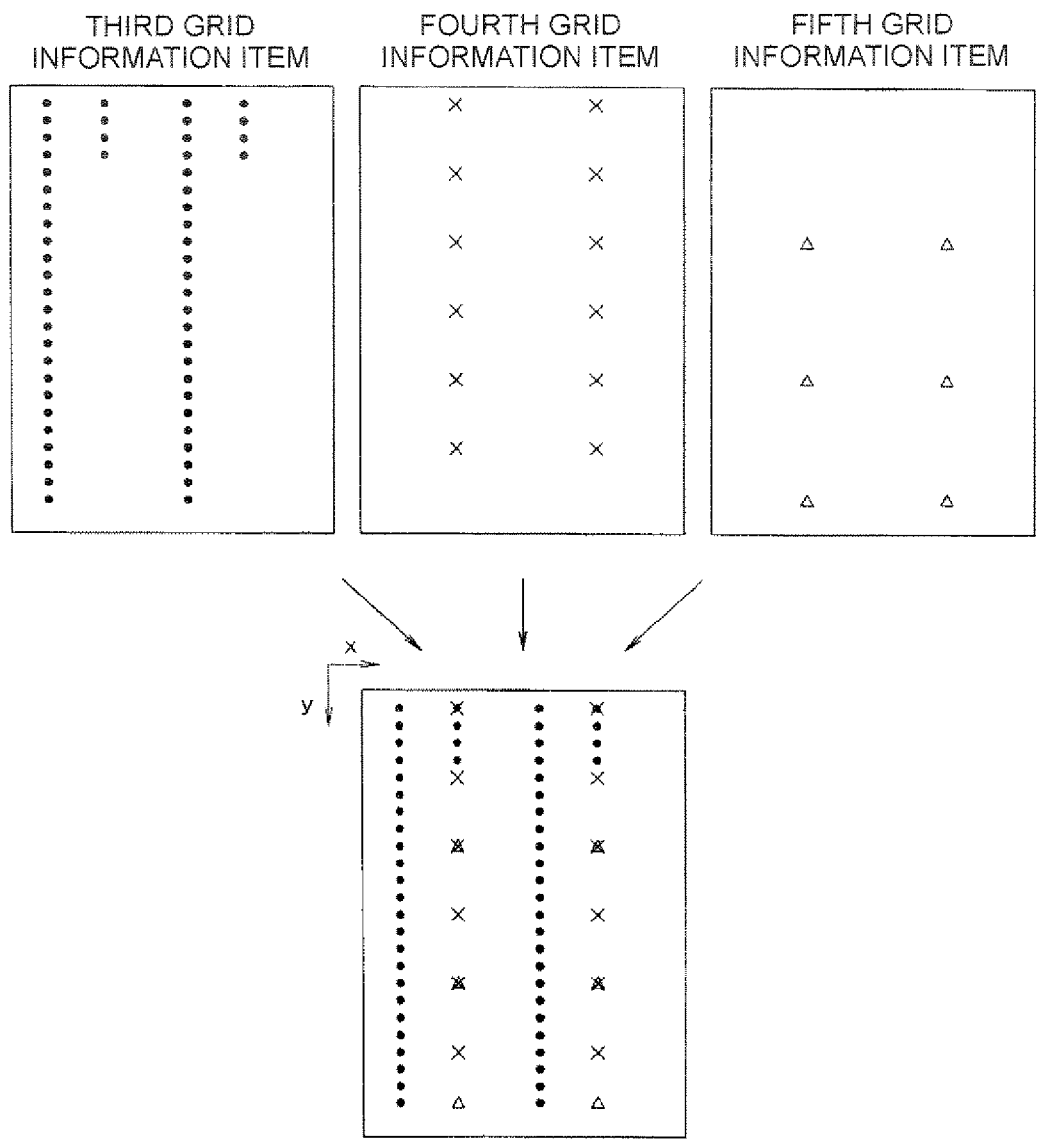
FIG. 11 is a diagram illustrating the display of grids based on the third to fifth grid information items.
FIG. 12 is a diagram illustrating the data structure of a sixth grid information item.

FIG. 11 is a diagram illustrating the display of grids based on the third to fifth grid information items.

As shown in FIG. 11, the third grid information item includes 24 grid points arranged in the y direction at an interval of '9' with the coordinates (25, 20) used as a start point, 4 grid points arranged in the y direction at an interval of '9' with the coordinates (60, 20) used as a start point, 24 grid points arranged in the y direction at an interval of '9' with the coordinates (115, 20) used as a start point, and 4 grid points arranged in the y direction at an interval of '9' with the coordinates (150, 20) used as a start point.

The fourth grid information item includes 7 grid points arranged in the y direction at an interval of '36' with the coordinates (60, 20) used as a start point and 7 grid points arranged in the y direction at an interval of '36' with the coordinates (150, 120) used as a start point.

The fifth grid information item includes 3 grid points arranged in the y direction at an interval of '72' with the coordinates (60, 92) used as a start point and 3 grid points arranged in the y direction at an interval of '72' with the coordinates (150, 92) used as a start point.

Therefore, a grid having the smallest interval between the grid points is applied to the content composed of text, and a grid having an interval followed by the smallest interval is applied to the content composed of a table. In addition, a grid having the largest interval between the grid points is applied to the content composed of an image, a photograph, a figure, or a graph.

Since it is necessary to minutely adjust the position of a character, a row, or a ruled line in the content composed of a table or text, the grid having a small interval between the grid points is applied to the content. In contrast, accurate positional alignment rather than minute positional adjustment needs to be performed on the content composed of an image, a photograph, a figure, or a graph in order to make a layout look nice, and thus the grid having a large interval between the grid points is applied to the content. In this way, it is possible to reduce the labor required for a layout operation and to make a layout look nice.

The size of content composed of an image or a table other than text cannot be anticipated. Therefore, when the content is attached at the right or left side, it is difficult to grasp the occupied area of the content. Thus, when a plurality of contents is laid out, the layout of the contents is unbalanced as a whole. For this reason, the attachment position of content other than text is set to the upper middle, the center, or the lower middle. In this way, it is possible to keep the entire balance of the layout of a plurality of contents having different sizes.

In this embodiment, a sixth grid information item shown in FIG. 12 is also used.

FIG. 12 is a diagram illustrating the data structure of the sixth grid information item.

As shown in FIG. 12, the sixth grid information item is applied when the data type of content is a caption. The caption is content that is subordinate to an image, a photograph, a figure, or a graph (hereinafter, the image, the photograph, the figure, and the graph are generally referred to as main content), and is arranged below the main content. The sixth grid information item defines one grid. Grid number 1 defines the grid of a caption subordinate to an image, a photograph, a figure, or a graph of the fifth grid information item, which is the main content, and also defines a plurality of grid points arranged in a rectangular region surrounded by a start point having start coordinates (60, 96) and an end point having the coordinates of the lower right of a layout region. The grid points are arranged at an interval of '90' in the x direction and an interval of '72' in the y direction. A position symmetric to the attachment position of the main content with respect to the center of the content, that is, the upper middle portion is defined as the attachment position.

FIG. 13 is a diagram illustrating the display of grids based on the fifth and sixth grid information items.

As shown in FIG. 13, the sixth grid information item includes 3 grid points arranged in the y direction at an interval of '72' with the coordinates (60, 96) used as a start point and 3 grid points arranged in the y direction at an interval of '72' with the coordinates (150, 96) used as a start point. The y coordinate of each of the start points is larger than that of each grid point of the fifth grid information item by '4'.

Therefore, the grid arranged around the lower side of the main content is applied to content composed of a caption.

The subordinate relationship between the caption and the main content can be represented by the layout by arranging the caption and the main content at a smaller interval than the interval between other contents. When the attachment position of the main content is the lower middle portion, the attachment position of the caption arranged below the attachment position of the main content is set to the upper middle portion, which makes it possible to approach the caption to the main content. In the case of horizontal writing, the caption approaches the main content in the horizontal direction, and in the case of vertical writing, the caption approaches the main content in the vertical direction, which makes it possible to represent a sense of unit in the layout.

Next, processes performed by the CPU 30 will be described below.

In this embodiment, when it is determined that the data type of content is an image, a photograph, a figure, or a graph, a process of enlarging or reducing the content such that at least two grid points are included in the region frame of the content while maintaining the aspect ratio of the content is performed instead of the process performed in step S122 shown in FIG. 6.

Next, the operation of this embodiment will be described below.

Figure 14:
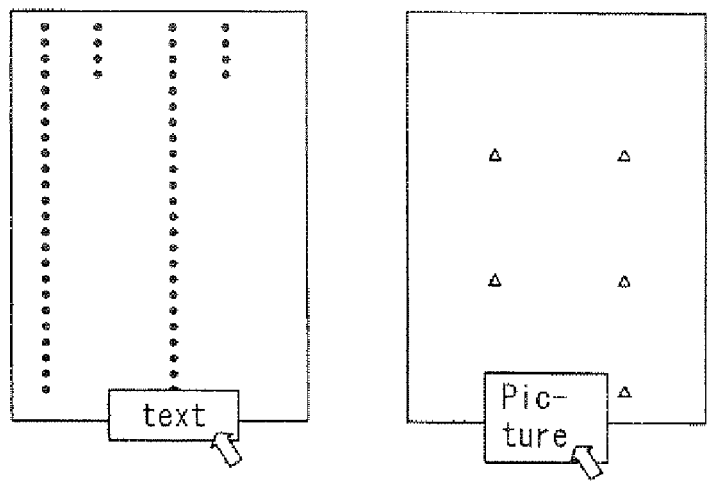
FIG. 14 is a diagram illustrating the display of grids changed according to the data type of content.

FIG. 14 is a diagram illustrating the display of the grid changed according to the data type of content.

In the layout apparatus 100, when a user creates or selects content by using the input device 40, the displayed grid is changed according to the data type of content, as shown in FIG. 14. For example, when content composed of text is created or selected, the third grid information item is searched through steps 104 and 114, and a grid having a small interval between the grid points is displayed on the basis of the searched third grid information item, as shown on the left side of FIG. 14. In contrast, when content composed of an image is created or selected, the fifth grid information item is searched, and a grid having a large interval between the grid points is displayed on the basis of the searched fifth grid information item, as shown on the right side of FIG. 14.

Figure 15:
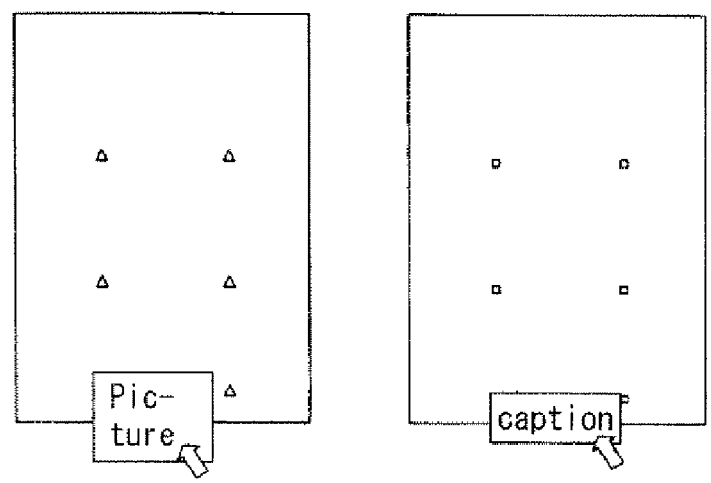
FIG. 15 is a diagram illustrating grids of main content and a caption.

FIG. 15 is a diagram illustrating the display of the grids of the main content and the caption.

First, when the main content is created or selected, the fifth grid information item is searched, and a grid corresponding to the main content is displayed on the basis of the searched fifth grid information item, as shown on the left side of FIG. 15. In contrast, when content composed of a caption is created or selected, the sixth grid information item is searched, and a grid corresponding to the caption is displayed on the basis of the searched sixth grid information item, as shown on the right side of FIG. 15.

Since the grid points of the caption are displayed around the lower sides of the grid points of the main content, it is possible to arrange the caption near to the main content. In addition, the main content is arranged such that the lower middle thereof is matched with the grid point, and the caption is arranged such that the upper middle thereof is matched with the grid point, which makes it possible to arrange the main content and the caption so as to be adjacent to each other. As a result, it is possible to represent the subordinate relationship between the main content and the caption in the layout.

Therefore, in this embodiment, content is acquired, and content attribute information is acquired from the acquired content. Then, grid information corresponding to the data type of content is searched from the storage device 42 on the basis of the acquired content attribute information, and the acquired content is arranged in a layout region with the position of a grid point used as a reference position, on the basis of the searched grid information.

In this way, the position of a grid point is changed according to the data type of content, which makes it possible to perform a layout operation without considering the data type of content. Therefore, it is possible to reduce the labor required for a layout operation, and to make a layout look nice for a user who is not accustomed to the layout, as compared with the related art.

Further, in this embodiment, the storage device 42 stores the third and fourth grid information items respectively having intervals between the grid points as first and second intervals and the fifth grid information item having an interval between the grid points larger than the first and second intervals as a third interval, and also stores the content attribute information for defining a table or text so as to be associated with the third and fourth grid information items.

In this way, when the data type of content is a table or text, an interval between the grid points becomes small, which makes it possible to perform minute positional adjustment. As a result, it is possible to make the layout look nice.

Further, in this embodiment, the storage device 42 stores the fifth grid information item for defining the position of a grid point, which is a first position, and the content attribute information for defining the main content such that the fifth grid information item and the content attribute information are associated with each other. Also, the storage device 42 stores the sixth grid information item for defining the position of a grid point, which is a second position separated from the first position within a predetermined distance, and the content attribute information for defining the caption such that the sixth grid information item and the content attribute information are associated with each other.

In this way, the caption and the main content are arranged so as to be adjacent to each other, which makes it possible to represent the subordinate relationship between the main content and the caption in the layout.

Furthermore, in this embodiment, the storage unit 42 stores the fourth to sixth grid information items for defining the center of content as the attachment position and content attribute information for defining the data type of content other than the text such that the fourth to sixth grid information items and the content attribute information are associated with each other.

In this way, when the data type of content is not the text, the content is arranged such that the center thereof is matched with the grid point. Therefore, when a plurality of layout elements is arranged, it is possible to keep the entire balance of the layout.

Further, in this embodiment, the storage device 42 stores the fifth grid information item for defining the attachment position of content as the lower middle portion and the content attribute information for defining the main content such that the fifth grid information item and the content attribute information are associated with each other. In addition, the storage device 42 stores the sixth grid information item for defining the attachment position of content as the upper middle portion and the content attribute information for defining the caption such that the sixth grid information item and the content attribute information are associated with each other.

In this way, the caption and the main content are arranged so as to be adjacent to each other, which makes it possible to represent the subordinate relationship between the main content and the caption in the layout.

In this embodiment, the content composed of an image, a photograph, a figure, or a graph is arranged in a small or large size such that at least two grid points are included in the region frame of the content.

When a character size is determined, only the interval between characters can be adjusted in the table or text, and thus the size of content is hardly changed. However, the size of an image, a photograph, a figure, or a graph can be changed easier than the text or table. Therefore, it is possible to easily make the sizes of a plurality of contents equal to one another by attaching two or more grid points, and thus to realize a balanced layout as a whole.

Further, in this embodiment, it is possible to enlarge or reduce the size of content composed of an image, a photograph, a figure, or a graph while maintaining the aspect ratio of the content.

In this way, since the aspect ratio is not changed, it is possible to make the layout look nice.

In this embodiment, the storage device 42 may store the third grid information item for defining an interval between rows of plural types of grid points and content attribute information for defining text, which is one type of content, and defining an interval between rows of the text such that the third grid information item and the content attribute information are associated with each other. In addition, when content includes text, the storage device 42 may store the third grid information item and content attribute information for defining the type of data, such as an image or a table, such that the third grid information item and the content attribute information are associated with each other.

Figure 23A:
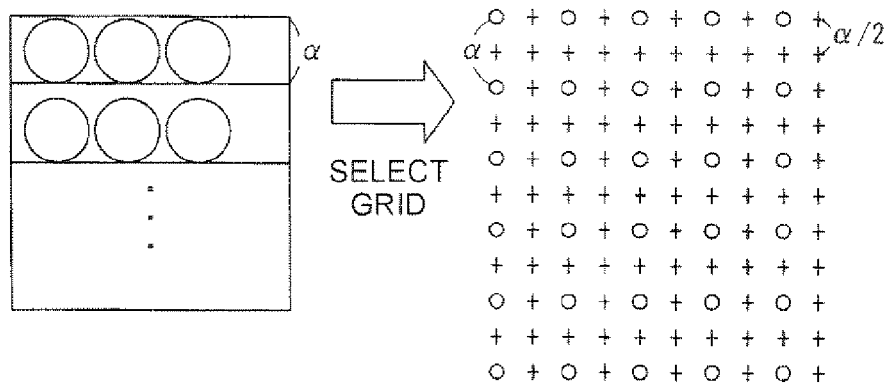
FIG. 23A is a diagram illustrating an example of an interval between rows of content.
Figure 23B:
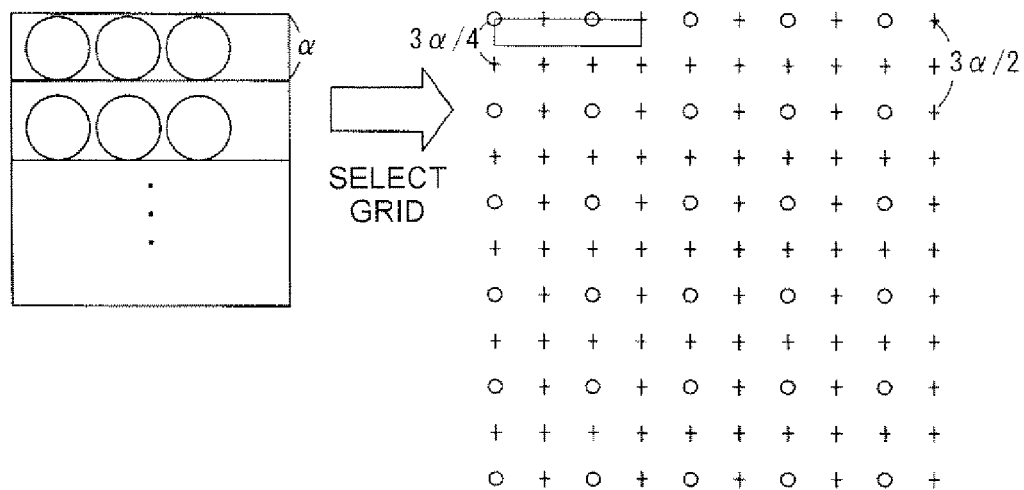
FIG. 23B is a diagram illustrating an example of the width of a grid, which is a candidate to be searched.

FIG. 23A is a diagram illustrating an example of an interval between rows in content, and FIG. 23B is a diagram illustrating an example of an interval between grids, which are candidates to be searched.

For example, it is assumed that content having rows arranged at an interval of $\alpha$ mm is laid out. For example, it is also assumed that third grid information item (No. 1) indicating rows of grid points arranged at an interval of $\alpha/2$ mm (grids composed of cross-shaped points in FIG. 23A) and third grid information item (No. 2) indicating rows of grid points arranged at an interval of $\alpha$ mm (grids composed of circular points in FIG. 23A) are grid information to be searched. In this case, the grid information searching unit 16 searches and selects the third grid information item (No. 2) indicating rows of grid points arranged at an interval of $\alpha$ mm from the two types of grid information items (No. 1 or No. 2) for the content having rows of grid points arranged at an interval of $\alpha$ mm. In FIG. 23A, a row having the circular grid points and the cross-shaped grid points alternately arranged indicates an overlap between the grid points (cross-shaped points) of the third grid information item (No. 1) and the grid points (circular point) of the third grid information item (No. 2).

As shown in FIG. 23B, for example, it is assumed that grid information to be searched, such as a third grid information item (No. 3) of a grid having rows of grid points arranged at an interval of $3\alpha/4$ mm (a grid composed of cross-shaped points in FIG. 23B) and a third grid information item (No. 4) of a grid having rows of grid points arranged at an interval of $3\alpha/2$ mm (a grid composed of circular points in FIG. 23B) is not matched with content having rows arranged at an interval of $\alpha$ mm. In addition, in FIG. 23B, a row having the circular grid points and the cross-shaped grid points alternately arranged therein indicates an overlap between the grid points (cross-shaped points) of the third grid information item (No. 3) and the grid points (circular point) of the third grid information item (No. 4). In this embodiment, in this case, the grid information searching unit 16 searches grid information on the basis of a multiplying factor 'b/a' of an interval between rows of a grid of the grid information to be searched with respect to an interval, $\alpha$ mm, between rows of content. More specifically, among the grid information items to be searched, the grid information searching unit 16 searches one grid information item in which the sum of a numerator 'a' and a denominator 'b' of the magnification b/a has a minimum value. Assuming that four types of grid information items respectively having multiplying factors of 1/1, 1/2, 3/2, and 3/4 are candidates to be searched, the sums of the numerators and the denominators of the multiplying factors are 2, 3, 5, and 7, respectively. Therefore, the grid information having the multiplying factor of 1/1 that has the minimum sum of 2 is searched and selected. In FIG. 23B, an interval between rows of grid points of the third grid information item (No. 3) is 3/2 times larger than the interval between rows of content, and an interval between rows of grid points of the third grid information item (No. 4) is 3/4 time larger than the interval between rows of content. Therefore, the third grid information item (No. 3) having the interval between rows of grid points that is 3/2 times larger than the interval between rows of content is searched and selected since the sum of the numerator and the denominator of the multiplying factor is small.

Therefore, grid information having an appropriate interval between rows of grid points is automatically searched according to the interval between rows of content, which makes it possible to make the layout look nice without considering the interval between rows of content (text).

In this embodiment, the storage device 42 may store a third grid information item for defining an interval between grids with respect to a character type of the text and content attribute information for defining text, which is one type of data, and a character type of the text such that the third grid information item and the content attribute information are associated with each other.

In this case, in this embodiment, the grid information searching unit 16 searches the third grid information for defining the positions of grid points of grids having an interval larger than the interval between rows of a specific character type.

FIGS. 24A and 24E are diagrams illustrating examples of standard character types, and FIGS. 24B to 24D and FIG. 24F are diagrams illustrating examples of a specific character type.

More specifically, for example, the grid information searching unit 16 searches the third grid information (No. 1) for defining the position of a grid having a length of '90' in the x direction and a width of '9' in the y direction for the standard character type shown in FIGS. 24A. In contrast, when the types of characters are a serif type as shown in FIG. 24B, a bold type as shown in FIG. 24C, and a character type having a large weight as shown in FIG. 24D, the grid information searching unit 16 searches the third grid information item (No. 2) for defining a grid having a length of '90' in the x direction and a width of '15' in the y direction. In this case, it is assumed that different types of characters have the same size. That is, when the characters shown in FIGS. 24B to 24D are arranged at an interval equal to or larger than the interval between the characters of the standard character type shown in FIG. 24A, they appear to be dense. For a specific character type having a large volume, the third grid information item for defining a grid having a length larger than a standard grid is searched, which makes it possible to lay out content by using the optimum grid.

FIGS. 24E and 24F are diagrams illustrating examples of Japanese characters. More specifically, FIG. 24E shows characters of a Ming-style type, which is a standard character type, and FIG. 24F shows characters of a Gothic type, which is a specific character type. As can be seen from FIGS. 24E and 24F, the Gothic-type character is bolder than the Ming-type character. When the Gothic-type characters and the Ming-type characters are arranged at the same interval, the Gothic-type characters appear to be denser than the Ming-type characters. In this case, the third grid information item for defining a grid having a size larger than the Ming-type character is searched, which makes it possible to lay out content of a Gothic type by using the optimum grid.

In this embodiment, the storage device 42 may store the third grid information item for defining the attachment position of alignment information of text and content attribute information for defining text, which is one type of data, and alignment information of the text such that the third grid information item and the content attribute information are associated with each other.

In this case, in this embodiment, according to the third grid information item, for example, when the text is aligned at the center in the vertical direction (center alignment in the vertical direction), the central position of a text region in the vertical direction is the attachment position When the text is aligned at the center in the horizontal direction (center alignment in the horizontal direction), the central position of a text region in the horizontal direction is the attachment position.

In this embodiment, according to the third grid information item, for example, when the text is aligned at the left side (left alignment), the left position of a text region (for example, the upper left, the middle left, or the lower left according to the position of the text in the vertical direction) is the attachment position. When the text is aligned at the right side (right alignment), the right position of a text region (for example, the upper right, the middle right, or the lower right according to the position of the text in the vertical direction) is the attachment position.

In this embodiment, according to the third grid information item, for example, when the text is aligned at the top side (top alignment), the upper position of a text region (for example, the upper left, the upper middle, or the upper right according to the position of the text in the horizontal direction) is the attachment position. When the text is aligned at the bottom side (bottom alignment), the lower position of a text region (for example, the lower left, the lower middle, or the lower right according to the position of the text in the horizontal direction) is the attachment position.

Next, the above will be described in detail with reference to FIGS. 25A to 27B.

Figure 25A:
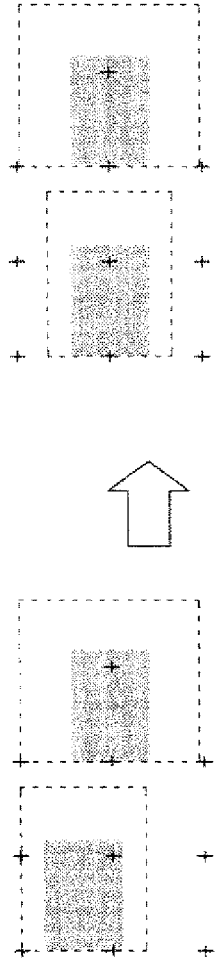
FIG. 25A is a diagram illustrating an example of an attachment position in center alignment in a vertical direction.
Figure 25B:
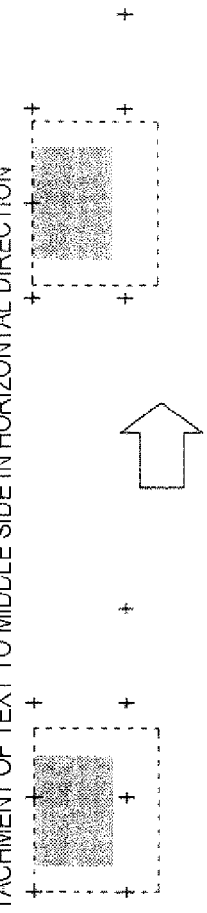
FIG. 25B is a diagram illustrating an example of an attachment position in center alignment in a horizontal direction.
Figure 26A:
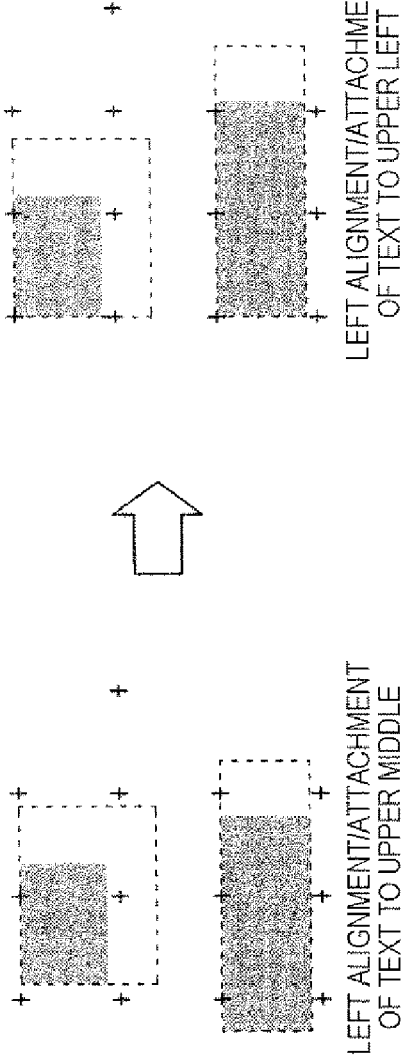
FIG. 26A is a diagram illustrating an example of an attachment position in left alignment.
Figure 26B:
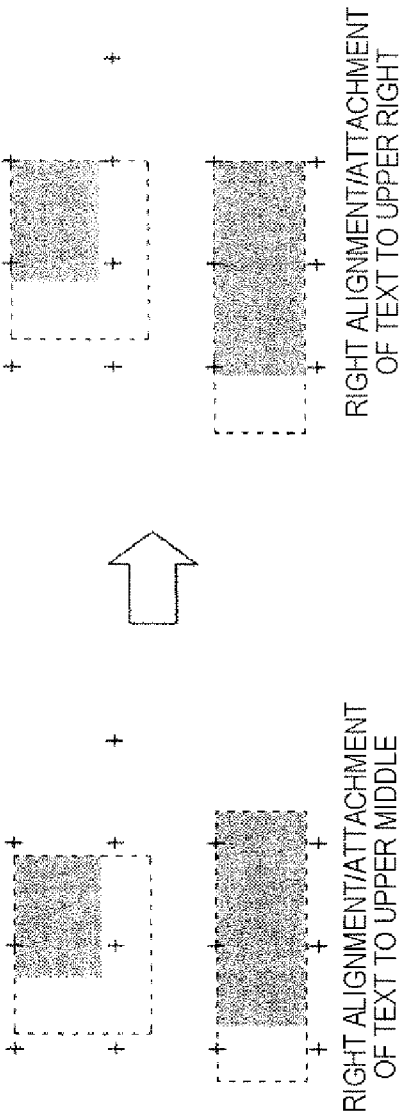
FIG. 26B is a diagram illustrating an example of an attachment position in right alignment.
Figure 27A:
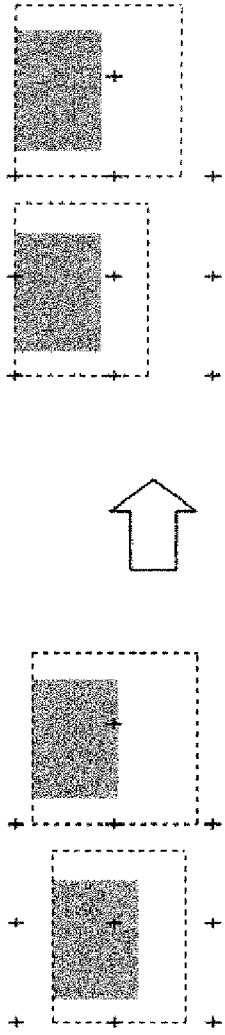
FIG. 27A is a diagram illustrating an example of an attachment position in top alignment.
Figure 27B:
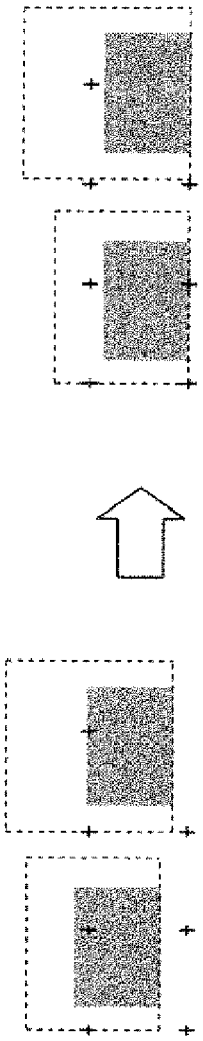
FIG. 27B is a diagram illustrating an example of an attachment position in bottom alignment.

FIG. 25A is a diagram illustrating an example of the attachment position in the center alignment in the vertical direction, and FIG. 25B is a diagram illustrating an example of the attachment position in the center alignment in the horizontal direction. FIG. 26A is a diagram illustrating an example of the attachment position in the left alignment, and FIG. 26B is a diagram illustrating an example of the attachment position in the right alignment. FIG. 27A is a diagram illustrating an example of the attachment position in top center alignment, and FIG. 27B is a diagram illustrating an example of the attachment position in bottom center alignment.

For example, when the text is arranged in the center alignment in the vertical direction, grids having the upper left as the attachment position are used to arrange two contents including text regions having different sizes side by side in the horizontal direction. Then, as shown on the left side of FIG. 25A, the positions of the text regions of the two contents are accurately aligned with each other, but the positions of texts of the two contents deviate from each other, which makes it difficult to read the texts and makes the layout look bad. Therefore, when the texts are arranged in the center alignment in the vertical direction, as shown on the right side of FIG. 25A, grids having the center in the vertical direction as the attachment position are selected (searched) to align the texts of the two contents, which makes it possible to easily read the texts of the two contents and makes the layout look nice. When the texts are arranged in the center alignment in the horizontal direction, grids having the upper left as the attachment position are used to arrange two contents including text regions having different sizes side by side in the vertical direction. Then, similar to the center alignment in the vertical direction, as shown on the left side of FIG. 25B, the positions of the texts of the two contents deviate from each other, which makes it difficult to read the texts and makes the layout look bad. Therefore, when the texts are arranged in the center alignment in the horizontal direction, as shown on the right side of FIG. 25B, grids having the center in the horizontal direction as the attachment position are selected (searched) to align the texts of the two contents, which makes it possible to easily read the texts of the two contents and makes the layout look nice.

For example, when the text is arranged in the left alignment, grids having the upper middle as the attachment position are used to arrange two contents including text regions having different sizes side by side in the vertical direction. Then, as shown on the left side of FIG. 26A, the positions of the text regions of the two contents are accurately aligned with each other, but the positions of texts of the two contents deviate from each other, which makes it difficult to read the texts and makes the layout look bad. Therefore, when the texts are arranged in the left alignment, as shown on the right side of FIG. 26A, grids having the upper left as the attachment position are selected to align the texts of the two contents, which makes it possible to easily read the texts of the two contents and makes the layout look nice. When the texts are arranged in the right alignment, similar to the left alignment, as shown on the left side of FIG. 26B, the positions of the texts of the two contents deviate from each other if grids having the upper middle as the attachment position are used, which makes it difficult to read the texts and makes the layout look bad. Therefore, when the texts are arranged in the right alignment, as shown on the right side of FIG. 26B, grids having the upper right as the attachment position are selected to align the texts of the two contents.

For example, when the text is arranged in the top alignment, grids having the middle left as the attachment position are used to arrange two contents including text regions having different sizes side by side in the horizontal direction. Then, as shown on the left side of FIG. 27A, the positions of the text regions of the two contents are accurately aligned with each other, but the positions of the texts of the two contents deviate from each other, which makes it difficult to read the texts and makes the layout look bad. Therefore, when the texts are arranged in the top alignment, as shown on the right side of FIG. 27A, grids having the upper left as the attachment position are selected to align the texts of the two contents, which makes it possible to easily read the texts of the two contents and makes the layout look nice. When the texts are arranged in the bottom alignment, grids having the middle left as the attachment position are used to arrange two contents including text regions having different sizes side by side in the horizontal direction. Then, similar to the top alignment, as shown on the left side of FIG. 27B, the positions of the texts of the two contents deviate from each other. Therefore, when the texts are arranged in the bottom alignment, as shown on the right side of FIG. 27B, grids having the lower left as the attachment position are used to align the texts of the two contents.

That is, the grid information searching unit 16 searches the grid information for defining the attachment position on the basis of content alignment information, which makes it possible to neatly lay out a plurality of contents having the same alignment information. In this embodiment, the text alignment information has been described above, but the invention is not limited thereto. For example, grid information for defining the optimum attachment position may be used for alignment information set to other contents, such as a figure and a table. That is, the storage device 42 may store the fourth grid information item or the fifth grid information item for defining an attachment position corresponding to content alignment information and content attribute information for defining the corresponding content alignment information such that these information items are associated with each other.

In the second embodiment, the grid information storage unit 10 and the storage device 42 correspond to a reference position information storage unit of a fifth, sixth, eighth, ninth, nineteenth, twenty-sixth, twenty-seventh, twenty-ninth, thirtieth, fortieth, forty-eighth, forty-ninth, fifty-first, fifty-second or sixty-second aspect. The content arranging unit 22 and steps S118 and S122 correspond to a layout element arranging unit of the seventh, tenth, eleventh, twelfth, and eighteenth to twenty-first aspects. In addition, steps S118 and S122 correspond to a layout element arranging step of twenty-eighth, thirty-first, thirty-second, thirty-third, thirty-ninth to forty-second, fiftieth, fifty-third, fifty-fourth, fifty-fifth, and sixty-first to sixty-fourth aspect. The grid point corresponds to a reference point of the fifth to seventh, eleventh, nineteenth, twenty-first, twenty-sixth to twenty-eighth, thirty-second, fortieth, forty-second, forty-eighth to fiftieth, fifty-fourth, and sixty-second to sixty-fourth aspects. The content corresponds to a layout element of the fourth to thirteenth, eighteenth, twentieth, twenty-first, twenty-fifth to thirty-fourth, thirty-ninth, forty-first to forty-third, forty-seventh to fifty-sixth, sixty-first, sixty-third, and sixth-fourth aspects.

In the second embodiment, the content attribute information corresponds to layout element attribute information of the fourth to sixth, eighth, ninth, tenth, eighteenth, twentieth, twenty-first, twenty-fifth to twenty-seventh, twenty-ninth, thirtieth, thirty-first, thirty-ninth, forty-first, forty-seventh to forty-ninth, fifty-first, fifty-second, fifty-third, sixty-first, sixty-third, and sixth-fourth aspects. The grid information corresponds to reference position information of the fifth to tenth, nineteenth, twenty-first, twenty-sixth to thirty-first, fortieth, forty-second, forty-eighth, fifty-second, and sixty-second to sixth-fourth aspects.

Next, a third embodiment of the invention will be described below with reference to the drawings. FIGS. 16A to 18 are diagrams illustrating a layout system, a layout program, a layout method according to the third embodiment of the invention.

In this embodiment of the invention, the layout system, the layout program, and the layout method are applied when an interval between grids is changed according to the type of structural elements of content in a document. The third embodiment differs from the second embodiment in that a grid of content composed of a footnote, a running title, or pagination is changed. Hereinafter, in the third embodiment, only the components different from those in the first and second embodiments will be described. In addition, in the third embodiment, the same components as those in the first and second embodiments have the same reference numerals, and a detailed description thereof will be omitted.

First, the data structure of grid information will be described below.

In this embodiment, seventh to ninth grid information items shown in FIGS. 16A to 16C are used.

FIGS. 16A to 16C are diagrams illustrating the data structure of the seventh to ninth grid information items.

As shown in FIG. 16A, the seventh grid information item is applied when the element type of content is a footnote, and defines 3 grids. Grid number 1 defines one grid point having start coordinates (20, 277) and also defines the lower left as an attachment position. Grid number 2 defines a plurality of grid points arranged in a rectangular region surrounded by a start point having start coordinates (10, 20) and an end point having the coordinates of the lower right of a layout region. The grid points are arranged at an interval of '36' in the y direction, and grid number 2 also defines the upper left as the attachment position. Grid number 3 defines a plurality of grid points arranged in a rectangular region surrounded by a start point having start coordinates (200, 20) and an end point having the coordinates of the lower right of the layout region. The grid points are arranged at an interval of '36' in the y direction, and grid number 3 also defines the upper right as the attachment position.

As shown in FIG. 16B, the eighth grid information item is applied when the element type of content is a running title, and defines 2 grids. Grid number 1 defines one grid point having start coordinates (25, 10) and also defines the upper left as an attachment position. Grid number 2 defines one grid point having start coordinates (185, 10) and also defines the upper right as an attachment position.

As shown in FIG. 16C, the ninth grid information item is applied when the element type of content is pagination, and defines 2 grids. Grid number 1 defines one grid point having start coordinates (25, 287) and also defines the lower left as an attachment position. Grid number 2 defines one grid point having start coordinates (185, 287) and also defines the lower right as an attachment position.

FIG. 17 is a diagram illustrating the display of grids based on the seventh to ninth grid information items.

As shown in FIG. 17, the grid of the seventh grid information item is composed of one grid point having the coordinates (20, 277), 6 grid points arranged in the y direction at an interval of '36' with the coordinates (10, 20) used as a start point, and 6 grid points arranged in the y direction at an interval of '36' with the coordinates (200, 20) used as a start point.

The grid of the eighth grid information item is composed of a grid point having the coordinates (25, 10) and a grid point having the coordinates (185, 10).

The grid of the ninth grid information item is composed of a grid point having the coordinates (25, 287) and a grid point having the coordinates (185, 287).

A grid for defining only the grid points at which the footnote will be arranged is applied to the content composed of the footnote, and a grid for defining only the grid points at which the running title will be arranged is applied to the content composed of the running title. In addition, a grid for defining only the grid points at which pagination will be arranged is applied to the content composed of the pagination.

When the user is not accustomed to the layout, the user may not know the exact position of the grid to be arranged. Therefore, it is possible for the user to arrange the content at the exact position by restricting the position of the grid.

When minute grids are laid out, minute positional deviation may occur in the position of page number or the position of a running title in each page. However, it is possible to prevent the minute positional deviation by reducing the number of grids.

Next, the operation of this embodiment will be described below.

Figures 18, 19A, 19B:
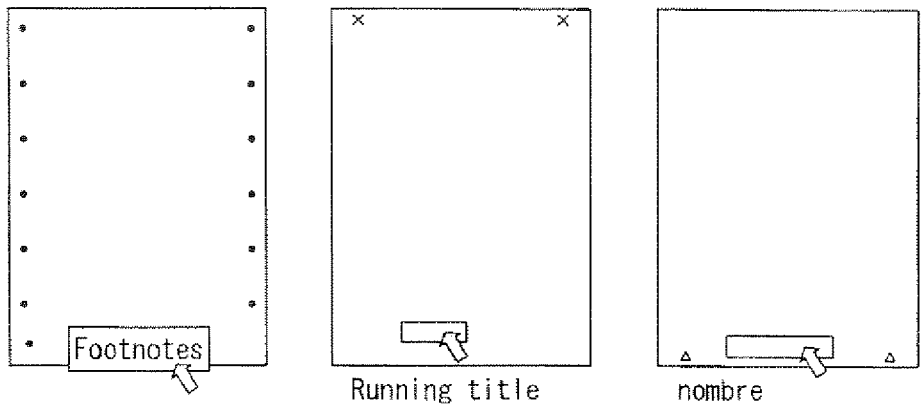
FIG. 18 is a diagram illustrating the display of grids changed according to the element type of content.
FIGS. 19A and 19B are diagrams illustrating the data structure of tenth and eleventh grid information items.

FIG. 18 is a diagram illustrating the display of the grid changed according to the element type of content.

In the layout apparatus 100, when a user creates or selects content by using the input device 40, the displayed grid is changed according to the element type of content, as shown in FIG. 18. For example, when content composed of a footnote, a running title, or pagination is created or selected, the seventh to ninth grid information items are searched through steps 104 and 114, and grids for defining only the grid points at which the footnote, the running title, and the pagination will be arranged are displayed on the basis of the searched seventh to ninth grid information items, as shown in FIG. 18.

In this embodiment, the storage device 42 stores grid information for defining only the position where the footnote, the running title, or the pagination will be arranged as the positions of the grid points and content attribute information for defining the footnote, the running title, or the pagination such that the grid information and the content attribute information are associated with each other.

In this way, when the element type of content is the footnote, the running title, or the pagination, the footnote, the running title, or the pagination can be arranged only at their specified positions. As a result, it is possible to make the layout look nice.

Further, in this embodiment, the storage device 42 stores grid information for defining different attachment positions according to the positions of the grid points and content attribute information for defining the footnote, the running title, or the pagination such that the grid information and the content attribute information are associated with each other.

In this way, the attachment position varies according to the positions of the grid points to be attached, and thus it is possible to make the layout look nice.

In the third embodiment, the grid information storage unit 10 and the storage device 42 correspond to a reference position information storage unit of fourteenth to sixteenth, thirty-fifth to thirty-seventh, and fifty-seventh to fifty-ninth aspects. The grid point corresponds to a reference point of the fourteenth to sixteenth, thirty-fifth to thirty-seventh, and fifty-seventh to fifty-ninth aspects. The content corresponds to a layout element of fourteenth to sixteenth, thirty-fifth to thirty-seventh, and fifty-seventh to fifty-ninth aspects. The content attribute information corresponds to layout element attribute information of the fourteenth to sixteenth, thirty-fifth to thirty-seventh, and fifty-seventh to fifty-ninth aspects. The grid information corresponds to reference position information of the fourteenth to sixteenth, thirty-fifth to thirty-seventh, and fifty-seventh to fifty-ninth aspects.

Next, a fourth embodiment of the invention will be described with reference to the drawings. FIGS. 19A to 21 are diagrams illustrating a layout system, a layout program, a layout method according to the fourth embodiment of the invention.

In the fourth embodiment of the invention, the layout system, the layout program, and the layout method are applied when an interval between grids is changed according to the element type of content. Hereinafter, in the fourth embodiment, only the components different from those in the first embodiment will be described. In addition, in the fourth embodiment, the same components as those in the first embodiment have the same reference numerals, and a detailed description thereof will be omitted.

First, the data structure of grid information will be described below.

In this embodiment, tenth and eleventh grid information items shown in FIGS. 19A and 19B are used.

FIGS. 19A and 19B are diagrams illustrating the data structure of the tenth to eleventh grid information items.

As shown in FIG. 19A, the tenth grid information item is applied when the element type of content is a title, and defines one grid. Grid number 1 defines a plurality of grid points arranged in a rectangular region surrounded by a start point having start coordinates (60, 20) and an end point having end coordinates (150, 200). The grid points are arranged at an interval of '90' in the x direction and an interval of '36' in the y direction. Grid number 1 also defines the upper middle as the attachment position.

As shown in FIG. 19B, the eleventh grid information item is applied when the element type of content is the body, and defines one grid. Grid number 1 defines a plurality of grid points arranged in a rectangular region surrounded by a start point having start coordinates (60, 20) and an end point having the coordinates of the lower right of a layout region. The grid points are arranged at an interval of '90' in the x direction and an interval of '9' in the y direction. Grid number 1 also defines the upper middle as the attachment position.

FIG. 20 is a diagram illustrating the display of grids based on the tenth and eleventh grid information items.

As shown in FIG. 20, the grid of the tenth grid information item is composed of 6 grid points arranged in the y direction at an interval of '36' with the coordinates (60, 20) used as a start point and 6 grid points arranged in the y direction at an interval of '36' with the coordinates (150, 20) used as a start point.

The grid of the eleventh grid information item is composed of 24 grid points arranged in the y direction at an interval of '9' with the coordinates (60, 20) used as a start point and 24 grid points arranged in the y direction at an interval of '9' with the coordinates (150, 20) used as a start point.

Therefore, the grid having a large interval between the grid points is used for the content composed of the title, and the grid having a small interval between the grid points is used for the content composed of the text.

Since the layout of the title means laying out a bundle of content starting from the title, the layout of the title determines the overall balance. Therefore, it is possible to realize a well-balanced layout by laying out the title with the grid having a large interval between the grid points.

Next, the operation of this embodiment will be described below.

Figure 21:
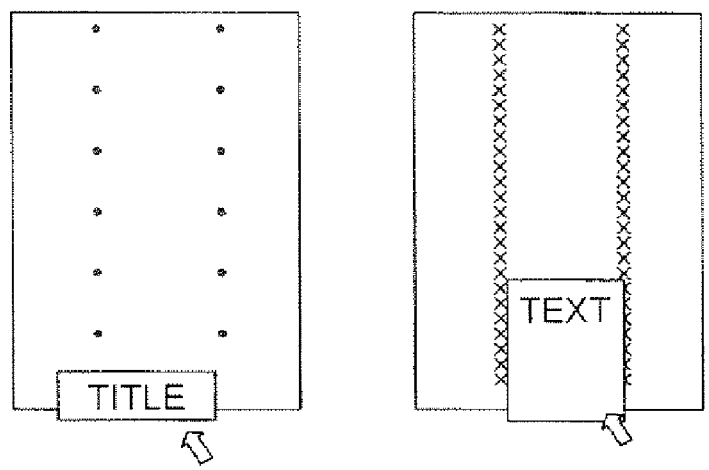
FIG. 21 is a diagram illustrating the display of grids changed according to the element type of content.

FIG. 21 is a diagram illustrating the display of the grid changed according to the element type of content.

In the layout apparatus 100, when a user creates or selects content by using the input device 40, the displayed grid is changed according to the element type of content, as shown in FIG. 21 For example, when the content composed of the title is created or selected, the tenth grid information item is searched through steps 104 and 114, and a grid having a large interval between the grid points is displayed on the basis of the searched tenth grid information item, as shown on the left side of FIG. 21. In contrast, when the content composed of the text is created or selected, the eleventh grid information item is searched, and a grid having a small interval between the grid points is displayed on the basis of the searched eleventh grid information item, as shown on the right side of FIG. 21.

Therefore, in this embodiment, content is acquired, and content attribute information is acquired from the acquired content. Then, grid information corresponding to the element type of content is searched from the storage device 42 on the basis of the acquired content attribute information, and the acquired content is arranged in a layout region with the position of a grid point used as a reference position, on the basis of the searched grid information.

In this way, the position of a grid point is changed according to the element type of content, which makes it possible to perform a layout operation without considering the element type of content. Therefore, it is possible to reduce the labor required for a layout operation, and to make the layout look nice for a user who is not accustomed to the layout, as compared with the related art.

Further, in this embodiment, the storage device 42 stores the eleventh grid information item having an interval between the grid points as a first interval and the tenth grid information item having an interval between the grid points as a second interval that is larger than the first interval such that the tenth grid information item and the content attribute information for defining a title are associated with each other.

In this way, when the element type of content is a title, an interval between the grid points becomes large, which makes it possible to perform accurate positional alignment. As a result, it is possible to make the layout look nice.

In this embodiment, the title and the text do not necessarily mean that the attribute of data is text. The title may be created with an image, and the image or photograph may be the body, and such cases are not excluded from the scope of the invention.

In the fourth embodiment, the grid information storage unit 10 and the storage device 42 correspond to a reference position information storage unit of a seventeenth, thirty-eighth, or sixtieth aspect. The grid point corresponds to a reference point of the seventeenth, thirty-eighth, or sixtieth aspect. The content corresponds to a layout element of the seventeenth, thirty-eighth, or sixtieth aspect. The content attribute information corresponds to layout element attribute information of the seventeenth, thirty-eighth, or sixtieth aspect. The grid information corresponds to reference position information of the seventeenth, thirty-eighth, or sixtieth aspect.

In the first to fourth embodiments according to the invention, the layout system, the layout program, and the layout method are applied when the user arranges content in a layout region to perform the layout, but the invention is not limited thereto. For example, the invention may be applied when the layout is automatically performed.

Figure 22:
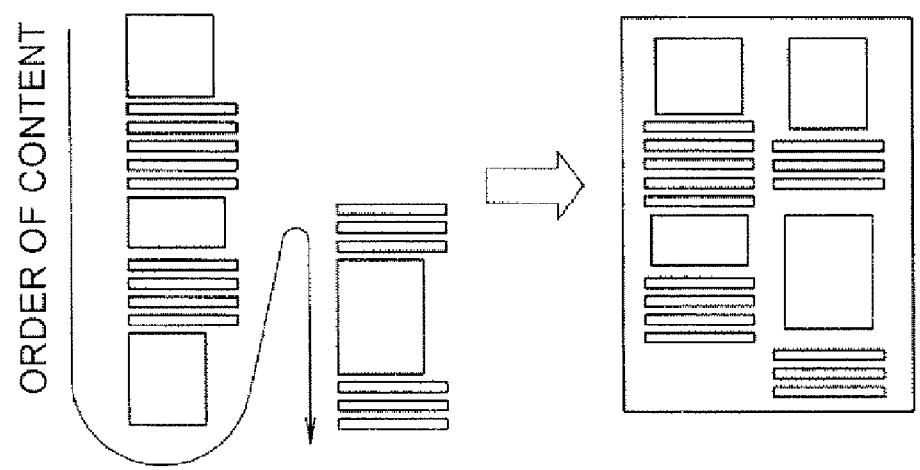
FIG. 22 is a diagram illustrating an automatic layout process.

FIG. 22 is a diagram illustrating the automatic layout.

In FIG. 22, the content shown on the left side is laid out in a two column formation in the order from the upper left to the lower left and from the upper right to lower right, according to the grids. The content having a size larger than a 12-point is laid out at a larger interval between grids, which makes it possible for large content to be neatly aligned.

In the third and fourth embodiments, the grid information is represented according to the element type of content. As can be seen from the comparison of FIGS. 10 and 12 with FIGS. 16 and 19, the element type and the data type can be dealt as the same content category attribute. Therefore, the element type is not necessarily distinguished from the data type. Similarly, in the second embodiment, the caption is called the data attribute, but it may be called an element attribute.

In the first to fourth embodiments, a plurality of grid points are arranged in the layout region, and content is arranged by using the grid points as the reference points. However, the invention is not limited thereto. For example, a plurality of grid lines may be arranged in a layout region, and content may be arranged by using the grid lines as reference lines. In a three-dimensional layout for arranging content in a layout region composed of a three-dimensional space, content may be arranged by using a grid surface as a reference surface.

In the above-described embodiments, when the layout process shown in the flow chart of FIG. 6 is performed, the control program stored in the ROM 32 beforehand is executed. However, the invention is not limited thereto. For example, a program including the layout process may be stored in a storage medium, the program may be read from the storage medium to the RAM 32, and then the program may be executed.

Any storage medium can be used as the above-mentioned structure storage medium without considering the type of storage medium as long as it can be read by a computer For example, any of the following storage media can be used as the storage medium: semiconductor storage media, such as a RAM and a ROM; magnetic storage media, such as an FD and an HD; optical storage media, such as a CD, a CDV, an LD, and a DVD; and magnetic/optical storage media, such as an MO.

Further, in the above-described embodiments according to the invention, the layout system, the layout program, and the layout method are applied when an interval between the grids is changed according to the attribute of content, but the invention is not limited thereto For example, various modifications and changes of the invention can be made without departing from the scope and spirit of the invention.

What is claimed is:

1. A layout system recorded on a computer readable medium that sets at least one of a plurality of reference points and a plurality of reference lines of a grid in a layout region and arranges a layout element in the layout region using the positions of the reference points or the reference lines as reference positions, comprising:

a reference position information storage unit that stores reference position information defining the positions of the at least one of the plurality of reference points and the plurality of reference lines and layout element attribute information defining an attribute of the layout element such that the reference position information and the layout element attribute information are associated with each other;

a layout element acquiring unit that acquires the layout element;

a layout element attribute information acquiring unit that acquires the layout element attribute information;

a reference position information searching unit that searches the reference position information corresponding to the layout element attribute information acquired by the layout element attribute information acquiring unit from the reference position information storage unit; and a layout element arranging unit that arranges the layout element acquired by the layout element acquiring unit in the layout region by using the positions of the at least one of the plurality of reference points and the plurality of reference lines as the reference positions, based on the reference position information searched by the reference position information searching unit;

wherein the layout element attribute information includes information defining the type of layout element, and wherein the layout element attribute information includes information defining an interval between rows when the layout element includes text.

2. The layout system according to claim 1, wherein the layout element attribute information includes information defining a size of the layout element.

3. The layout system according to claim 2, wherein the reference position information storage unit stores the reference position information having an interval between the at least one of the plurality of reference points and the plurality of reference lines as a first interval and the layout element attribute information defining a first size such that the reference position information and the layout element attribute information are associated with each other; and the reference position information storage unit stores the reference position information having an interval between the at least one of the plurality of reference points and the plurality of reference lines as a second interval that is larger than the first interval and the layout element attribute information defining a second size larger than the first size such that the reference position information and the layout element attribute information are associated with each other.

4. The layout system according to claim 1, wherein the reference position information storage unit stores the reference position information having a first interval between the at least one of the plurality of reference points and the plurality of reference lines and the reference position information having a second interval between the at least one of the plurality of reference points and the plurality of reference lines that is larger than the first interval; and the reference position information storage unit stores the reference position information having the first interval and the layout element attribute information defining at least one of a text and a table, which is one type of layout element, such that the reference position information and the layout element attribute information are associated with each other.

5. The layout system according to claim 1, wherein the reference position information storage unit stores the reference position information defining the positions of the at least one of the plurality of reference points and the plurality of reference lines as first positions and the layout element attribute information defining a first type such that the reference position information and the layout element attribute information are associated with each other; and the reference position information storage unit stores the reference position information defining the positions of the at least one of the plurality of reference points and the plurality of reference lines as second positions separated from the first positions within a predetermined range and the layout element attribute information defining a second type, which is a type of layout element that is subordinate to the layout element of the first type such that the reference position information and the layout element attribute information are associated with each other.

6. The layout system according to claim 1, wherein the reference position information includes information defining an attachment position matched with the at least one of the plurality of reference points and the plurality of reference lines in a region of the layout element, and the layout element arranging unit arranges the layout element such that the attachment position is matched with the at least one of the plurality of reference points and the plurality of reference lines.

7. The layout system according to claim 6, wherein the reference position information storage unit stores the reference position information defining a center of the layout element as the attachment position and the layout element attribute information defining the type of layout element other than text such that the reference position information and the layout element attribute information are associated with each other.

8. The layout system according to claim 6, wherein the reference position information storage unit stores the layout element attribute information defining a first type and the reference position information defining as the attachment position a first position facing a layout element, which is subordinate to the layout element of the first type, with respect to a center of the layout element such that the layout element attribute information and the reference position information are associated with each other, and the reference position information storage unit stores the reference position information defining as the attachment position a second position symmetric to the first position with respect to the center of the layout element and the layout element attribute information defining the subordinate layout element as a second type such that the reference position information and the layout element attribute information are associated with each other.

9. The layout system according to claim 6, wherein the layout element attribute information includes alignment information of the layout element, and the reference position information includes information defining the attachment position based on the alignment information.

10. The layout system according to claim 1, wherein the layout element arranging unit changes a size of the layout element such that at least two of the at least one of the plurality of reference points and the plurality of reference lines are included in a region frame of the layout element.

11. The layout system according to claim 10, wherein the layout element arranging unit changes the size of the layout element while maintaining an aspect ratio thereof.

12. The layout system according to claim 10, wherein the layout element comprises at least one of an image, a photograph, a figure, and a graph.

13. The layout system according to claim 1, wherein the reference position information storage unit stores the layout element attribute information defining an arrangement position of the layout element according to the type of layout element and the reference position information defining only a position where the layout element will be arranged as the positions of the at least one of the plurality of reference points and the plurality of reference lines such that the layout element attribute information and the reference position information are associated with each other.

14. The layout system according to claim 13, wherein the reference position information storage unit stores the layout element attribute information defining at least one of a footnote, a running title, and pagination as the type of layout element and the reference position information defining only a position where the footnote, the running title, or the pagination will be arranged as the positions of the at least one of the plurality of reference points and the plurality of reference lines such that the layout element attribute information and the reference position information are associated with each other.

15. The layout system according to claim 6, wherein the reference position information storage unit stores the reference position information defining the attachment position changed according to the positions of the at least one of the plurality of reference points and the plurality of reference lines and the layout element attribute information defining at least one of a footnote, a running title, and pagination as the type of layout element such that the layout element attribute information and the reference position information are associated with each other.

16. The layout system according to claim 1, wherein the reference position information storage unit stores the reference position information having an interval between the at least one of the plurality of reference points and the plurality of reference lines as a first interval and the reference position information having an interval between the at least one of the plurality of reference points and the plurality of reference lines as a second interval that is larger than the first interval, and the reference position information storage unit stores the reference position information having the second interval and the layout element attribute information defining a title, which is one type of layout element, such that the reference position information and the layout element attribute information are associated with each other.

17. The layout system according to claim 1, wherein, when the reference position information corresponding to the interval between the rows is not stored in the reference position information storage unit, the reference position information searching unit searches from the reference position information storage unit reference position information in which an interval between the at least one of the plurality of reference points and the plurality of reference lines is 'a/b' times larger than an interval between the rows ('a' and 'b' are integers) and a sum of 'a' and 'b' is a minimum value.

18. A layout system recorded on a computer readable medium that sets at least one of a plurality of reference points and a plurality of reference lines of a grid in a layout region and arranges a layout element in the layout region using the positions of the reference points or the reference lines as reference positions, comprising:

a reference position information storage unit that stores reference position information defining the positions of the at least one of the plurality of reference points and the plurality of reference lines and layout element attribute information defining an attribute of the layout element such that the reference position information and the layout element attribute information are associated with each other;

a layout element acquiring unit that acquires the layout element;

a layout element attribute information acquiring unit that acquires the layout element attribute information;

a reference position information searching unit that searches the reference position information corresponding to the layout element attribute information acquired by the layout element attribute information acquiring unit from the reference position information storage unit; and a layout element arranging unit that arranges the layout element acquired by the layout element acquiring unit in the layout region by using the positions of the at least one of the plurality of reference points and the plurality of reference lines as the reference positions, based on the reference position information searched by the reference position information searching unit;

wherein the layout element attribute information includes information defining the type of layout element, and wherein the layout element attribute information includes information defining a character type when the layout element includes text.

19. The layout system according to claim 18, wherein the reference position information storage unit stores the reference position information having a larger interval between the at least one of the plurality of reference points and the plurality of reference lines of the layout element having a specific character type than that of a layout element having a character type other than the specific character type and the layout element attribute information defining the specific character type such that the reference position information and the layout element attribute information are associated with each other.

20. A layout program recorded on a computer readable medium that sets at least one of a plurality of reference points and a plurality of reference lines of a grid in a layout region and arranges a layout element in the layout region using the positions of the at least one of the plurality of reference points and the plurality of reference lines as reference positions, comprising a program that causes a computer to execute the steps of:

acquiring the layout element;

acquiring layout element attribute information defining an attribute of the layout element;

searching reference position information corresponding to the layout element attribute information acquired in the acquiring of the layout element attribute information from a reference position information storage unit that stores the reference position information defining the positions of the at least one of the plurality of reference points and the plurality of reference lines and the layout element attribute information such that the reference position information and the layout element attribute information are associated with each other;

arranging the layout element acquired in the acquiring of the layout element in the layout region by using the positions of the at least one of the plurality of reference points and the plurality of reference lines as the reference positions, based on the reference position information searched in the searching of the reference position information;

wherein the layout element attribute information includes information defining the type of layout element; and wherein the layout element attribute information includes information defining an interval between rows when the layout element includes text.

\* \* \* \* \*